US012713357B2

(12) United States Patent
Zhang et al.

(10) Patent No.: US 12,713,357 B2
(45) Date of Patent: Aug. 18, 2026

(54) METHOD AND APPARATUS FOR DOWNLINK POWER ALLOCATION FOR 16 QAM MODULATION SCHEME IN NB-IoT SYSTEM

(71) Applicant: Telefonaktiebolaget LM Ericsson (publ), Stockholm (SE)

(72) Inventors: Liping Zhang, Beijing (CN); Gerardo Agni Medina Acosta, Märsta (SE); Jie Chen, Beijing (CN); Emre Yavuz, Stockholm (SE); Ritesh Shreevastav, Upplands Väsby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 467 days.

(21) Appl. No.: 18/249,855

(22) PCT Filed: Oct. 22, 2021

(86) PCT No.: PCT/SE2021/051061

§ 371 (c)(1),
(2) Date: Apr. 20, 2023

(87) PCT Pub. No.: WO2022/086426

PCT Pub. Date: Apr. 28, 2022

(65) Prior Publication Data

US 2024/0298269 A1 Sep. 5, 2024

(30) Foreign Application Priority Data

Oct. 23, 2020 (WO) ................ PCT/CN2020/123357

(51) Int. Cl.
*H04W 52/14* (2009.01)
*H04L 27/34* (2006.01)
*H04W 52/32* (2009.01)

(52) U.S. Cl.
CPC .......... *H04W 52/143* (2013.01); *H04L 27/34* (2013.01); *H04W 52/32* (2013.01)

(58) Field of Classification Search
CPC . H04W 52/243; H04W 52/42; H04W 72/563; H04W 72/20; H04W 52/143;
(Continued)

(56) References Cited

U.S. PATENT DOCUMENTS

2003/0039217 A1* 2/2003 Seo ..................... H04W 52/32
2014/0369295 A1* 12/2014 Takahashi ............ H04W 52/16
(Continued)

FOREIGN PATENT DOCUMENTS

WO 2017160513 A1 9/2017
WO 2021155395 A1 8/2021

OTHER PUBLICATIONS

European Extended Search Report dated Aug. 1, 2024 for Application No. 21883418.2, consisting of 10 pages.
(Continued)

*Primary Examiner* — Lana N Le
(74) *Attorney, Agent, or Firm* — Weisberg I.P. Law, P.A.

(57) ABSTRACT

Various embodiments of the present disclosure provide methods and apparatuses for 16 Quadrature Amplitude Modulation (QAM) modulation scheme in a Narrowband Internet of Things (NB-IoT) system. The method implemented at a network node in the NB-IoT system includes transmitting downlink power allocation for 16 QAM modulation scheme to a terminal device in the NB-IoT system, wherein the downlink power allocation indicates data-to-pilot power ratio information to be used for determining Narrowband Physical Downlink Shared Channel (NPDSCH) energy per resource element (EPRE).

16 Claims, 8 Drawing Sheets

(58) Field of Classification Search

CPC . H04W 52/32; H04W 72/232; H04W 52/325; H04W 52/262; H04W 72/21; H04W 72/51; H04B 1/525; H04B 7/15578; H04B 7/26

See application file for complete search history.

(56) References Cited

U.S. PATENT DOCUMENTS

| | | | | |
|---|---|---|---|---|
| 2016/0037460 | A1* | 2/2016 | Benjebbour | H04W 52/42 |
| 2017/0273026 | A1* | 9/2017 | Fakoorian | H04W 52/143 |
| 2018/0091959 | A1* | 3/2018 | Sun | H04W 52/143 |
| 2019/0215782 | A1* | 7/2019 | Lee | H04L 5/0048 |
| 2021/0258201 | A1* | 8/2021 | Sengupta | H04L 5/0044 |
| 2021/0336836 | A1* | 10/2021 | Ratasuk | H04L 27/34 |
| 2023/0309028 | A1* | 9/2023 | Li | H04W 52/325 |
| 2024/0030942 | A1* | 1/2024 | Qu | H04W 72/232 |

OTHER PUBLICATIONS

3GPP TSG RAN WG1 #102-e R1-2006192; Title: Support of 16-QAM for NB-Iot; Agenda Item:8.9.1; Source: Qualcomm Incorporated; Document for: Discussion and Decision; Location and Date: e-Meeting, Aug. 17-28, 2020, consisting of 8 pages.

3GPP TS 36.331 V16.2.0 3rd Generation Partnership Project; Technical Specification Group Radio Access Network; Evolved Universal Terrestrial Radio Access (E-UTRA); Radio Resource Control (RRC); Protocol specification (Release 16); Sep. 2020, consisting of 1081 pages.

International Search Report and Written Opinion dated Jan. 11, 2022 for International Application No. PCT/SE2021/051061 filed Oct. 22, 2021, consisting of 16-pages.

3GPP TS 36.331 V16.1.1; 3rd Generation Partnership Project; Technical Specification Group Radio Access Network; Evolved Universal Terrestrial Radio Access (E-UTRA); Radio Resource Control (RRC); Protocol specification (Release 16); Jul. 2020, consisting of 1078-pages.

3GPP TSG RAN WG1 Meeting #102-e R1-2005304; Title: Support of 16QAM for unicast in UL and DL in NB-IoT; Agenda Item: 8.9.1; Source: Huawei, HiSilicon; Document for: Discussion and Decision; Date and Location: Aug. 17-28, 2020, E-meeting, consisting of 6-pages.

3GPP TSG RAN WG1 Meeting #104-e R1-2102030; Title: Feature lead summary #2 on 104-e-LTE-Rel17_NB_IoT_eMTC-01; Agenda Item: 8.9.1; Source: Moderator (Huawei); Document for: Discussion and Decision; Date and Location: Jan. 25-Feb. 5, 2021, E-Meeting, consisting of 45-pages.

3GPP TSG RAN WG1 Meeting #105-e R1-2104288; Title: Support of 16QAM for unicast in UL and DL in NB-IoT; Agenda Item: 8.9.1; Source: Huawei, HiSilicon; Document for: Discussion and Decision; Date and Location: May 10-27, 2021, E-meeting, consisting of 4-pages.

3GPP TS 36.213 V16.0.0; 3rd Generation Partnership Project; Technical Specification Group Radio Access Network; Evolved Universal Terrestrial Radio Access (E-UTRA); Physical layer procedures (Release 16); Dec. 2019, consisting of 568-pages.

3GPP TSG RAN WG1 Meeting #91 R1-1721298; Title: Correction of NRS-CRS power offset configuration for NB-IoT; Source to WG: ZTE, Sanechips; Work Item Code: NB_IOTenh-Core; Date and Location: Nov. 27-Dec. 1, 2017, Reno, USA, consisting of 3-pages.

3GPP TSG-RAN WG1 Meeting #105-e R1-2105889; Title: Support of 16-QAM for unicast in UL and DL in NB-IoT; Agenda Item: 8.9.1; Source: Ericsson; Document for: Discussion and Decision; Date and Location: May 10-27, 2021, e-Meeting, consisting of 13-pages.

3GPP TSG RAN Meeting #86 RP-193264; Title: New WID on Rel-17 enhancements for NB-IoT and LTE-MTC; Agenda Item: 10.1.1; Source: Huawei, HiSilicon; Document for: Approval; Date and Location: Dec. 9-12, 2019, Sitges, Spain, consisting of 5-pages.

* cited by examiner

METHOD AND APPARATUS FOR DOWNLINK POWER ALLOCATION FOR 16 QAM MODULATION SCHEME IN NB-IoT SYSTEM

CROSS-REFERENCE TO RELATED APPLICATIONS

This application is a Submission Under 35 U.S.C. § 371 for U.S. National Stage Patent Application of International Application No.: PCT/SE2021/051061, filed Oct. 22, 2021 entitled "METHOD AND APPARATUS FOR DOWNLINK POWER ALLOCATION FOR 16 QAM MODULATION SCHEME IN NB-IOT SYSTEM," which claims priority to International Application No.: PCT/CN2020/123357, filed Oct. 23, 2020, the entireties of both of which are incorporated herein by reference.

FIELD OF THE INVENTION

The present disclosure generally relates to wireless communications, and more specifically, to methods and apparatuses for downlink (DL) power allocation for 16 Quadrature Amplitude Modulation (QAM) modulation scheme in a Narrowband Internet of Things (NB-IoT) system.

BACKGROUND

This section introduces aspects that may facilitate a better understanding of the disclosure. Accordingly, the statements of this section are to be read in this light and are not to be understood as admissions about what is in the prior art or what is not in the prior art.

At the RAN plenary meeting #86, a new Work Item (WI) entitled "Rel-17 enhancements for NB-IoT and LTE-MTC" was agreed. In the Work Item Description (WID), one of the objectives states the following:

Specify 16-QAM for unicast in UL and DL, including necessary changes to DL power allocation for NPDSCH and DL TBS. This is to be specified without a new NB-IoT UE category. For DL, increase in maximum TBS of e.g. 2× the Rel-16 maximum, and soft buffer size will be specified by modifying at least existing Category NB2. For UL, the maximum TBS is not increased. [NB-IoT] [RAN1, RAN4]

Current NB-IoT downlink power allocation and LTE downlink power allocation are described below from 3GPP TS36.213 v16.0.0.

NB-IoT Downlink Power Allocation

An eNodeB determines downlink transmit energy per resource element (EPRE).

For an NB-IoT cell, a UE may assume narrowband reference signal (NRS) EPRE is constant across downlink NB-IoT system bandwidth and constant across all subframes that contain NRS, until different NRS power information is received.

The downlink NRS EPRE can be derived from downlink narrowband reference signal transmit power given by nrs-Power+nrs-PowerOffsetNonAnchor, where the parameter nrs-Power is provided by higher layers and the parameter nrs-PowerOffsetNonAnchor is zero if it is not provided by higher layers. The downlink narrowband reference signal transmit power is defined as a linear average over power contributions (in [W]) of all resource elements that carry narrowband reference signals within an operating NB-IoT system bandwidth.

A UE may assume that a ratio of NB-IOT Wake-Up Signal (NWUS) EPRE to NRS EPRE is 0 dB.

A UE may assume a ratio of Narrowband Physical Downlink Shared Channel (NPDSCH) EPRE to NRS EPRE among NPDSCH resource elements (REs) (not applicable to NPDSCH REs with zero EPRE) is 0 dB for an NB-IoT cell with one NRS antenna port and −3 dB for an NB-IoT cell with two NRS antenna ports.

A UE may assume a ratio of Narrowband Physical Broadcast Channel (NPBCH) EPRE to NRS EPRE among NPBCH REs (not applicable to NPBCH REs with zero EPRE) is 0 dB for an NB-IoT cell with one NRS antenna port and −3 dB for an NB-IoT cell with two NRS antenna ports.

A UE may assume a ratio of Narrowband Physical Downlink Control Channel (NPDCCH) EPRE to NRS EPRE among NPDCCH REs (not applicable to NPDCCH REs with zero EPRE) is 0 dB for an NB-IoT cell with one NRS antenna port and −3 dB for an NB-IoT cell with two NRS antenna ports.

If a higher layer parameter operationModelnfo indicates '00' or samePCI-Indicator indicates 'samePCI' for a cell, a ratio of NRS EPRE to CRS EPRE is given by the parameter nrs-CRS-PowerOffset if the parameter nrs-CRS-PowerOffset is provided by higher layers, and the ratio of NRS EPRE to CRS EPRE may be assumed to be 0 dB if the parameter nrs-CRS-PowerOffset is not provided by higher layers. If the parameter nrs-CRS-PowerOffset is provided by higher layers and is a non-integer value, the value of the parameter nrs-Power is 0.23 dBm higher than indicated.

LTE Downlink Power Allocation

An eNodeB determines the downlink transmit EPRE.

For the purpose of Reference Signal Received Power (RSRP) and Reference Signal Received Quality (RSRQ) measurements, the UE may assume downlink cell-specific RS EPRE is constant across the downlink system bandwidth and constant across all subframes with discovery signal transmissions until different cell-specific RS power information is received.

For a cell that is not a license assisted access (LAA) secondary cell (SCell), the UE may assume downlink cell-specific RS EPRE is constant across the downlink system bandwidth and constant across all subframes until different cell-specific RS power information is received.

The downlink cell-specific RS EPRE can be derived from downlink reference signal transmit power given by the parameter referenceSignalPower provided by higher layers. The downlink reference signal transmit power is defined as a linear average over power contributions (in [W]) of all resource elements that carry cell-specific reference signals within an operating system bandwidth.

A ratio of Physical Downlink Shared Channel (PDSCH) EPRE to cell-specific RS EPRE among PDSCH REs (not applicable to PDSCH REs with zero EPRE) for each Orthogonal Frequency Division Multiplexing (OFDM) symbol is denoted by either $\rho_A$ or $\rho_B$ according to an OFDM symbol index as given by Table 5.2-2 and Table 5.2-3. In addition, $\rho_A$ and $\rho_B$ are UE-specific.

TABLE 5.2-2

OFDM symbol indices within a slot of a non-MBSFN subframe where the ratio of the corresponding PDSCH EPRE to the cell-specific RS EPRE is denoted by $\rho_A$ or $\rho_B$

| Number of antenna ports | OFDM symbol indices within a slot where the ratio of the corresponding PDSCH EPRE to the cell-specific RS EPRE is denoted by $\rho_A$ | | OFDM symbol indices within a slot where the ratio of the corresponding PDSCH EPRE to the cell-specific RS EPRE is denoted by $\rho_B$ | |
|---|---|---|---|---|
| | Normal cyclic prefix | Extended cyclic prefix | Normal cyclic prefix | Extended cyclic prefix |
| One or two | 1, 2, 3, 5, 6 | 1, 2, 4, 5 | 0, 4 | 0, 3 |
| Four | 2, 3, 5, 6 | 2, 4, 5 | 0, 1, 4 | 0, 1, 3 |

For a UE in transmission mode 8-10 when UE-specific RSs are not present in the PRBs upon which the corresponding PDSCH is mapped or in transmission modes 1-7, the UE may assume that for 16 QAM, 64 QAM, 256 QAM, or 1024 QAM spatial multiplexing with more than one layer or for PDSCH transmissions associated with the multi-user multi-input-multi-output (MIMO) transmission scheme, or for a UE in transmission modes 2-4 and configured with higher layer parameter must-Config-r14 the UE may assume that for Quadrature Phase Shift Keying (QPSK), $\rho_A$ is equal to $\delta_{power\text{-}offset}+P_A+10\log_{10}(2)$ [dB] when the UE receives a PDSCH data transmission using precoding for transmit diversity with four cell-specific antenna ports according to Subclause 6.3.4.3 of 3GPP TS36.331 v16.1.1;

$\rho_A$ is equal to $\delta_{power\text{-}offset}+P_A$ [dB] otherwise, where ($\delta_{power\text{-}offset}$ is 0 dB for all PDSCH transmission schemes except multi-user MIMO as described in Subclause 7.1.5 and where $P_A$ is a UE specific parameter provided by higher layers.

The cell-specific ratio $\rho_B/\rho_A$ is given by Table 5.2-1 according to a cell-specific parameter $P_B$ signaled by higher layers and the number of configured eNodeB cell specific antenna ports. The parameter $P_B$ is given by a higher layer parameter p-b-r13 for PDSCH scrambled by G-RNTI and by a higher layer parameter p-b otherwise. In case that PDSCH is scrambled by G-RNTI, if $P_B$ is not configured, the UE may assume that $\rho_B/\rho_A=1$.

TABLE 5.2-1

The cell-specific ratio $\rho_B/\rho_A$ for 1, 2, or 4 cell specific antenna ports

| $\rho_B$ | $\rho_B/\rho_A$ | |
|---|---|---|
| | One Antenna Port | Two and Four Antenna Ports |
| 0 | 1 | 5/4 |
| 1 | 4/5 | 1 |
| 2 | 3/5 | 3/4 |
| 3 | 2/5 | 1/2 |

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure proposes a solution of downlink power allocation for support of 16 QAM modulation scheme in downlink in a NB-IoT system.

According to a first aspect of the present disclosure, there is provided a method implemented at a network node in a NB-IoT system. The method comprises transmitting downlink power allocation for 16 QAM modulation scheme to a terminal device in the NB-IoT system, the downlink power allocation indicating data-to-pilot power ratio information to be used for determining Narrowband Physical Downlink Shared Channel, NPDSCH, energy per resource element, EPRE.

In accordance with an exemplary embodiment, the data-to-pilot power ratio information may be based on a deployment mode of the NB-IoT system.

In accordance with an exemplary embodiment, the deployment mode may be Stand-alone deployment or Guard-band deployment, and the data-to-pilot power ratio information may comprise a first data-to-pilot power ratio for NPDSCH symbols without narrowband reference signal, NRS, and a second data-to-pilot power ratio for NPDSCH symbols with NRS.

In accordance with an exemplary embodiment, the first and second data-to-pilot power ratios may be UE specific and transmitted in Msg4 for random access.

In accordance with an exemplary embodiment, the method may further comprise determining the NPDSCH EPRE as follows at least partly based on the data-to-pilot power ratio information:

for NPDSCH symbols without NRS,

NPDSCH EPRE=NRS EPRE+the first data-to-pilot power ratio; and for NPDSCH symbols with NRS, NPDSCH EPRE=NRS EPRE+the second data-to-pilot power ratio.

In accordance with an exemplary embodiment, the deployment mode may be In-band deployment, and the data-to-pilot power ratio information may comprise a third data-to-pilot power ratio for NPDSCH symbols without NRS and without channel reference signal, CRS, and a fourth data-to-pilot power ratio for NPDSCH symbols with NRS and without CRS, and a fifth data-to-pilot power ratio for NPDSCH symbols without NRS and with CRS.

In accordance with an exemplary embodiment, the third, fourth and fifth data-to-pilot power ratios may be UE specific and transmitted in Msg4 for random access.

In accordance with an exemplary embodiment, the method may further comprise determining the NPDSCH EPRE as follows at least partly based on the data-to-pilot power ratio information:

for NPDSCH symbols without NRS and without CRS,

NPDSCH EPRE=NRS EPRE+the third data-to-pilot power ratio;

for NPDSCH symbols with NRS and without CRS,

NPDSCH EPRE=NRS EPRE+the fourth data-to-pilot power ratio; and for NPDSCH symbols without NRS and with CRS, NPDSCH EPRE=NRS EPRE+the fifth data-to-pilot power ratio.

In accordance with an exemplary embodiment, the deployment mode may be Stand-alone deployment or Guard-band deployment, and the data-to-pilot power ratio information may comprise a first configured parameter indicating a first data-to-pilot power ratio for NPDSCH symbols without NRS, and a second configured parameter indicating a linear ratio between a second data-to-pilot power ratio for NPDSCH symbols with NRS and the first data-to-pilot power ratio.

In accordance with an exemplary embodiment, the first configured parameter may be UE specific and transmitted in Msg4 for random access, and the second configured parameter may be cell specific and transmitted in System Information Block 2-NB.

In accordance with an exemplary embodiment, the first configured parameter may be UE specific and transmitted in Msg4 for random access, and the second configured parameter may be carrier specific and transmitted in System Information Block 22-NB or in Msg4 for random access.

In accordance with an exemplary embodiment, the method may further comprise determining the NPDSCH EPRE as follows at least partly based on the data-to-pilot power ratio information:

for NPDSCH symbols without NRS,

NPDSCH EPRE=NRS EPRE+the first data-to-pilot power ratio, where the first data-to-pilot power ratio is equal to the first configured parameter; and for NPDSCH symbols with NRS, NPDSCH EPRE=NRS EPRE+the second data-to-pilot power ratio, where the second data-to-pilot power ratio is calculated based on the second configured parameter and the first data-to-pilot power ratio.

In accordance with an exemplary embodiment, the deployment mode may be In-band deployment, and the data-to-pilot power ratio information may comprise a third configured parameter indicating a third data-to-pilot power ratio for NPDSCH symbols without NRS and without CRS, a fourth configured parameter indicating a linear ratio between a fourth data-to-pilot power ratio for NPDSCH symbols with NRS and without CRS and the third data-to-pilot power ratio, and a fifth configured parameter indicating a linear ratio between a fifth data-to-pilot power ratio for NPDSCH symbols without NRS and with CRS and the third data-to-pilot power ratio.

In accordance with an exemplary embodiment, the third configured parameter may be UE specific and transmitted in Msg4 for random access, and the fourth and fifth configured parameters may be cell specific and transmitted in System Information Block 2-NB.

In accordance with an exemplary embodiment, the third configured parameter may be UE specific and transmitted in Msg4 for random access, and the fourth and fifth configured parameters may be carrier specific and transmitted in System Information Block 22-NB or in Msg4 for random access.

In accordance with an exemplary embodiment, the method may further comprise determining the NPDSCH EPRE as follows at least partly based on the data-to-pilot power ratio information:

for NPDSCH symbols without NRS and without CRS,

NPDSCH EPRE=NRS EPRE+the third data-to-pilot power ratio, where the third data-to-pilot power ratio is equal to the third configured parameter;

for NPDSCH symbols with NRS and without CRS,

NPDSCH EPRE=NRS EPRE+the fourth data-to-pilot power ratio, where the fourth data-to-pilot power ratio is calculated based on the fourth configured parameter and the third data-to-pilot power ratio; and for NPDSCH symbols without NRS and with CRS, NPDSCH EPRE=NRS EPRE+the fifth data-to-pilot power ratio, where the fifth data-to-pilot power ratio is calculated based on the fifth configured parameter and the third data-to-pilot power ratio.

In accordance with an exemplary embodiment, the deployment mode may be In-band deployment, and the data-to-pilot power ratio information may comprise a third configured parameter indicating a third data-to-pilot power ratio for NPDSCH symbols without NRS and without CRS, and a fourth configured parameter indicating a linear ratio between a fourth data-to-pilot power ratio for NPDSCH symbols with NRS and without CRS and the third data-to-pilot power ratio.

In accordance with an exemplary embodiment, the third configured parameter may be UE specific and transmitted in Msg4 for random access, and the fourth configured parameter may be cell specific and transmitted in System Information Block 2-NB.

In accordance with an exemplary embodiment, the third configured parameter may be UE specific and transmitted in Msg4 for random access, and the fourth configured parameter may be carrier specific and transmitted in System Information Block 22-NB or in Msg4 for random access.

In accordance with an exemplary embodiment, the method may further comprise determining the NPDSCH EPRE as follows at least partly based on the data-to-pilot power ratio information:

for NPDSCH symbols without NRS and without CRS,

NPDSCH EPRE=NRS EPRE+the third data-to-pilot power ratio, where the third data-to-pilot power ratio is equal to the third configured parameter;

for NPDSCH symbols with NRS and without CRS,

NPDSCH EPRE=NRS EPRE+the fourth data-to-pilot power ratio, where the fourth data-to-pilot power ratio is calculated based on the fourth configured parameter and the third data-to-pilot power ratio; and for NPDSCH symbols without NRS and with CRS, NPDSCH EPRE is calculated as a function of a ratio of NRS EPRE to CRS EPRE under a pre-defined assumption.

In accordance with an exemplary embodiment, the pre-defined assumption may be that a ratio of NPDSCH EPRE between NPDSCH symbols without NRS and without CRS and NPDSCH symbols without NRS and with CRS is 0 dB, or that total symbol powers for NPDSCH symbols without NRS and without CRS and NPDSCH symbols without NRS and with CRS are the same.

In accordance with an exemplary embodiment, the NRS EPRE may be carrier specific.

In accordance with an exemplary embodiment, the NRS EPRE may be calculated as follows:

for an anchor carrier,

NRS EPRE=downlink narrowband reference signal transmit power nrs-Power, and for a non-anchor carrier, NRS EPRE=nrs-Power+nrs-powerOffsetNonAnchor.

In accordance with an exemplary embodiment, the first configured parameter or the third configured parameter may be set to a default value when the 16 QAM modulation scheme is used for Radio Resource Control dedicated signaling.

In accordance with an exemplary embodiment, the method may further comprise transmitting the determined NPDSCH EPRE to the terminal device.

According to a second aspect of the present disclosure, there is provided a method implemented at a terminal device in a NB-IoT system. The method comprises receiving downlink power allocation for 16 QAM modulation scheme from a network node in the NB-IoT system, the downlink power allocation indicating data-to-pilot power ratio information to be used for determining NPDSCH EPRE. The method further comprises obtaining the NPDSCH EPRE determined at least partly based on the data-to-pilot power ratio information.

In accordance with an exemplary embodiment, the data-to-pilot power ratio information may be based on a deployment mode of the NB-IoT system.

In accordance with an exemplary embodiment, the deployment mode may be Stand-alone deployment or Guard-band deployment, and the data-to-pilot power ratio information may comprise a first data-to-pilot power ratio for NPDSCH symbols without NRS and a second data-to-pilot power ratio for NPDSCH symbols with NRS.

In accordance with an exemplary embodiment, the first and second data-to-pilot power ratios may be UE specific and received in Msg4 for random access.

In accordance with an exemplary embodiment, the NPDSCH EPRE may be determined as follows:

for NPDSCH symbols without NRS,

NPDSCH EPRE=NRS EPRE+the first data-to-pilot power ratio; and for NPDSCH symbols with NRS, NPDSCH EPRE=NRS EPRE+the second data-to-pilot power ratio.

In accordance with an exemplary embodiment, the deployment mode may be In-band deployment, and the data-to-pilot power ratio information may comprise a third data-to-pilot power ratio for NPDSCH symbols without NRS and without CRS, and a fourth data-to-pilot power ratio for NPDSCH symbols with NRS and without CRS, and a fifth data-to-pilot power ratio for NPDSCH symbols without NRS and with CRS.

In accordance with an exemplary embodiment, the third, fourth and fifth data-to-pilot power ratios may be UE specific and received in Msg4 for random access.

In accordance with an exemplary embodiment, the NPDSCH EPRE may be determined as follows:

for NPDSCH symbols without NRS and without CRS,

NPDSCH EPRE=NRS EPRE+the third data-to-pilot power ratio;

for NPDSCH symbols with NRS and without CRS,

NPDSCH EPRE=NRS EPRE+the fourth data-to-pilot power ratio; and for NPDSCH symbols without NRS and with CRS, NPDSCH EPRE=NRS EPRE+the fifth data-to-pilot power ratio.

In accordance with an exemplary embodiment, the deployment mode may be Stand-alone deployment or Guard-band deployment, and the data-to-pilot power ratio information may comprise a first configured parameter indicating a first data-to-pilot power ratio for NPDSCH symbols without NRS, and a second configured parameter indicating a linear ratio between a second data-to-pilot power ratio for NPDSCH symbols with NRS and the first data-to-pilot power ratio.

In accordance with an exemplary embodiment, the first configured parameter may be UE specific and received in Msg4 for random access, and the second configured parameter may be cell specific and received in System Information Block 2-NB.

In accordance with an exemplary embodiment, the first configured parameter may be UE specific and received in Msg4 for random access, and the second configured parameter may be carrier specific and received in System Information Block 22-NB or in Msg4 for random access.

In accordance with an exemplary embodiment, the NPDSCH EPRE may be determined as follows:

for NPDSCH symbols without NRS,

NPDSCH EPRE=NRS EPRE+the first data-to-pilot power ratio, where the first data-to-pilot power ratio is equal to the first configured parameter; and for NPDSCH symbols with NRS, NPDSCH EPRE=NRS EPRE+the second data-to-pilot power ratio, where the second data-to-pilot power ratio is calculated based on the second configured parameter and the first data-to-pilot power ratio.

In accordance with an exemplary embodiment, the deployment mode may be In-band deployment, and the data-to-pilot power ratio information may comprise a third configured parameter indicating a third data-to-pilot power ratio for NPDSCH symbols without NRS and without CRS, a fourth configured parameter indicating a linear ratio between a fourth data-to-pilot power ratio for NPDSCH symbols with NRS and without CRS and the third data-to-pilot power ratio, and a fifth configured parameter indicating a linear ratio between a fifth data-to-pilot power ratio for NPDSCH symbols without NRS and with CRS and the third data-to-pilot power ratio.

In accordance with an exemplary embodiment, the third configured parameter may be UE specific and received in Msg4 for random access, and the fourth and fifth configured parameters may be cell specific and received in System Information Block 2-NB.

In accordance with an exemplary embodiment, the third configured parameter may be UE specific and received in Msg4 for random access, and the fourth and fifth configured parameters may be carrier specific and received in System Information Block 22-NB or in Msg4 for random access.

In accordance with an exemplary embodiment, the NPDSCH EPRE may be determined as follows:

for NPDSCH symbols without NRS and without CRS,

NPDSCH EPRE=NRS EPRE+the third data-to-pilot power ratio, where the third data-to-pilot power ratio is equal to the third configured parameter;

for NPDSCH symbols with NRS and without CRS,

NPDSCH EPRE=NRS EPRE+the fourth data-to-pilot power ratio, where the fourth data-to-pilot power ratio is calculated based on the fourth configured parameter and the third data-to-pilot power ratio; and for NPDSCH symbols without NRS and with CRS, NPDSCH EPRE=NRS EPRE+the fifth data-to-pilot power ratio, where the fifth data-to-pilot power ratio is calculated based on the fifth configured parameter and the third data-to-pilot power ratio.

In accordance with an exemplary embodiment, the deployment mode may be In-band deployment, and the data-to-pilot power ratio information may comprise a third configured parameter indicating a third data-to-pilot power ratio for NPDSCH symbols without NRS and without CRS, and a fourth configured parameter indicating a linear ratio between a fourth data-to-pilot power ratio for NPDSCH symbols with NRS and without CRS and the third data-to-pilot power ratio.

In accordance with an exemplary embodiment, the third configured parameter may be UE specific and transmitted in Msg4 for random access, and the fourth configured parameter may be cell specific and transmitted in System Information Block 2-NB.

In accordance with an exemplary embodiment, the third configured parameter may be UE specific and transmitted in Msg4 for random access, and the fourth configured parameter may be carrier specific and transmitted in System Information Block 22-NB or in Msg4 for random access.

In accordance with an exemplary embodiment, the NPDSCH EPRE may be determined as follows:

for NPDSCH symbols without NRS and without CRS,

NPDSCH EPRE=NRS EPRE+the third data-to-pilot power ratio, where the third data-to-pilot power ratio is equal to the third configured parameter;

for NPDSCH symbols with NRS and without CRS,

NPDSCH EPRE=NRS EPRE+the fourth data-to-pilot power ratio, where the fourth data-to-pilot power ratio is calculated based on the fourth configured parameter and the third data-to-pilot power ratio; and for NPDSCH symbols without NRS and with CRS, NPDSCH EPRE is calculated as a function of a ratio of NRS EPRE to CRS EPRE under a pre-defined assumption.

In accordance with an exemplary embodiment, the pre-defined assumption may be that a ratio of NPDSCH EPRE between NPDSCH symbols without NRS and without CRS and NPDSCH symbols without NRS and with CRS is 0 dB, or that total symbol powers for NPDSCH symbols without NRS and without CRS and NPDSCH symbols without NRS and with CRS are the same.

In accordance with an exemplary embodiment, the NRS EPRE may be carrier specific.

In accordance with an exemplary embodiment, the NRS EPRE may be calculated as follows:

for an anchor carrier,

NRS EPRE=downlink narrowband reference signal transmit power nrs-Power, and for a non-anchor carrier, NRS EPRE=nrs-Power+nrs-powerOffsetNonAnchor.

In accordance with an exemplary embodiment, the first configured parameter or the third configured parameter may be set to a default value when the 16 QAM modulation scheme is used for Radio Resource Control dedicated signaling.

According to a third aspect of the present disclosure, there is provided a network node in a NB-IoT system. The network node may comprise one or more processors and one or more memories comprising computer program codes. The one or more memories and the computer program codes may be configured to, with the one or more processors, cause the network node at least to perform any step of the method according to the first aspect of the present disclosure.

According to a fourth aspect of the present disclosure, there is provided a computer-readable medium having computer program codes embodied thereon which, when executed on a computer, cause the computer to perform any step of the method according to the first aspect of the present disclosure.

According to a fifth aspect of the present disclosure, there is provided a terminal device in a NB-IoT system. The terminal device may comprise one or more processors and one or more memories comprising computer program codes. The one or more memories and the computer program codes may be configured to, with the one or more processors, cause the terminal device at least to perform any step of the method according to the second aspect of the present disclosure.

According to a sixth aspect of the present disclosure, there is provided a computer-readable medium having computer program codes embodied thereon which, when executed on a computer, cause the computer to perform any step of the method according to the second aspect of the present disclosure.

With the embodiments of the present disclosure, the 16 QAM modulation scheme can be supported in downlink for NB-IoT and can also be supported in both anchor and non-anchor carriers.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
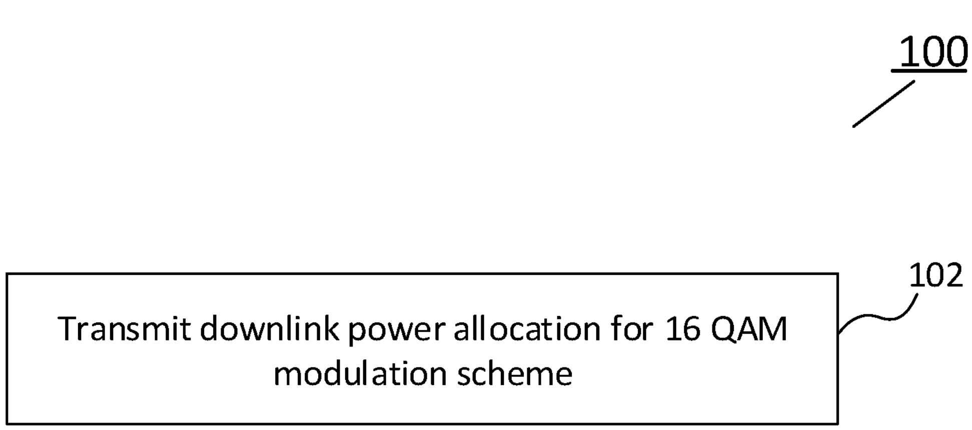
FIG. 1 is a flowchart illustrating a method implemented at a network node in the NB-IoT system according to some embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node or network device may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), an IAB node, a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As described above, in NB-IoT, for QPSK modulation scheme, the UE may assume that the ratio of NPDSCH EPRE to NRS EPRE among NPDSCH REs (not applicable to NPDSCH REs with zero EPRE) is 0 dB for an NB-IoT cell with one NRS antenna port and −3 dB for an NB-IoT cell with two NRS antenna ports.

However, in Rel-17 with the introduction of the 16-QAM modulation scheme, the ratio of NPDSCH EPRE to NRS EPRE would be required for the 16-QAM demodulation. In RAN1 #102e the following agreement was reached in relation to the downlink power allocation for 16 QAM modulation scheme:

For DL power allocation, support signaling the ratio of NPDSCH EPRE to NRS EPRE.

FFS signaling details, including how/whether to signal the ratio for the following cases:

NPDSCH in symbols without NRS and CRS

NPDSCH in symbols with CRS (only for "In-band" deployment)

NPDSCH in symbols with NRS

For the support of 16-QAM in downlink, data-to-pilot power ratios (e.g., the ratio of NPDSCH EPRE to NRS EPRE) are to be standardized accounting for all deployment modes. Nonetheless, signaling aspects and differences between anchor and non-anchor carriers have not been addressed.

Therefore, it is desirable for a solution of downlink power allocation for the 16 QAM modulation scheme in downlink in NB-IoT.

In accordance with some exemplary embodiments, the present disclosure provides a solution for downlink power allocation for the support of the 16 QAM modulation scheme in downlink. The solution may be applied to a NB-IoT system including a terminal device such as a UE and a base station such as an eNodeB. With the solution, the 16

QAM modulation scheme can be supported in downlink for NB-IoT and can also be supported for both anchor and non-anchor carriers in NB-IoT.

It is noted that some embodiments of the present disclosure are mainly described in relation to 5G specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does not limit the present disclosure naturally in any way. Rather, any other system configuration or radio technologies may equally be utilized as long as exemplary embodiments described herein are applicable.

FIG. 1 is a flowchart illustrating a method 100 according to some embodiments of the present disclosure. The method 100 illustrated in FIG. 1 may be performed by an apparatus implemented in/as a network node or communicatively coupled to a network node in the NB-IoT system. In accordance with an exemplary embodiment, the network node may be an eNodeB.

According to the exemplary method 100 illustrated in FIG. 1, the network node transmits downlink power allocation for 16 QAM modulation scheme to a terminal device in the NB-IoT system, as shown in block 102. The downlink power allocation indicates data-to-pilot power ratio information to be used for determination of NPDSCH EPRE. In some embodiments, the terminal device may be a UE or a NB-IoT device.

In some embodiments, the data-to-pilot power ratio information may be based on a deployment mode of the NB-IoT system. The deployment mode of the NB-IoT system may include Stand-alone deployment, Guard-band deployment, and In-band deployment. The data-to-pilot power ratio information may be different depending on the deployment mode.

For the Stand-alone deployment or the Guard-band deployment, there are two types of NPDSCH symbols. Type A refers to NPDSCH symbols without NRS, and Type B refers to NPDSCH symbols with NRS. Thus, in some embodiments, the data-to-pilot power ratio information may comprise a first data-to-pilot power ratio $\rho_1$ [dB] for Type A (i.e. NPDSCH symbols without NRS), and a second data-to-pilot power ratio $\rho_2$ [dB] for Type B (i.e. NPDSCH symbols with NRS). The first data-to-pilot power ratio $\rho_1$ and the second data-to-pilot power ratio $\rho_2$ may be configured as UE specific and transmitted to the UE. In an embodiment, the first data-to-pilot power ratio $\rho_1$ and the second data-to-pilot power ratio $\rho_2$ may be transmitted in Msg4 for random access.

Alternatively, in some embodiments, for the Stand-alone deployment or the Guard-band deployment, the data-to-pilot power ratio information may comprise a first configured parameter $P_1$ indicating the first data-to-pilot power ratio $\rho_1$, and a second configured parameter $P_2$ indicating a linear ratio between the second data-to-pilot power ratio $\rho_2$ and the first data-to-pilot power ratio $\rho_1$. In some embodiments, the first configured parameter $P_1$ is configured as UE specific and the second configured parameter $P_2$ is configured as cell specific. Thus, the first configured parameter $P_1$ may be transmitted in Msg4 for random access, and the second configured parameter $P_2$ may be transmitted in System Information Block 2-NB (SIB2-NB). Alternatively, the second configured parameter $P_2$ may be configured as carrier specific, and thus may be transmitted in SIB22-NB or Msg4. In some embodiments, the first data-to-pilot power ratio $\rho_1$ is equal to the first configured parameter $P_1$. The second configured parameter $P_2$ may be an index that refers to the linear ratio between $\rho_2$ and $\rho_1$, i.e., $$10^{\left(\frac{\rho_1}{10}\right)}/10^{\left(\frac{\rho_2}{10}\right)}.$$

For the In-band deployment, there are three types of NPDSCH symbols. Type A refers to NPDSCH symbols without NRS and without CRS, Type B refers to NPDSCH symbols with NRS and without CRS, and Type C refers to NPDSCH symbols without NRS and with CRS. Thus, in some embodiments, the data-to-pilot power ratio information may comprise a third data-to-pilot power ratio $\rho_3$ [dB] for Type A (i.e. NPDSCH symbols without NRS and without CRS), a fourth data-to-pilot power ratio $\rho_4$ [dB] for Type B (i.e. NPDSCH symbols with NRS and without CRS), and a fifth data-to-pilot power ratio $\rho_5$ [dB] for Type C (i.e. NPDSCH symbols without NRS and with CRS). The third, fourth and fifth data-to-pilot power ratios $\rho_3$, $\rho_4$ and $\rho_5$ may be configured as UE specific. In an embodiment, $\rho_3$, $\rho_4$ and ρ5 may be transmitted in Msg4.

Alternatively, in some embodiments, for the In-band deployment, the data-to-pilot power ratio information may comprise a third configured parameter $P_3$ indicating the third data-to-pilot power ratio $\rho_3$, a fourth configured parameter $P_4$ indicating a linear ratio between the fourth data-to-pilot power ratio $\rho_4$ and the third data-to-pilot power ratio $\rho_3$, and a fifth configured parameter $P_5$ indicating a linear ratio between the fifth data-to-pilot power ratio $\rho_5$ and the third data-to-pilot power ratio $\rho_3$. In some embodiments, the third configured parameter $P_3$ is configured as UE specific, and the fourth and fifth configured parameters $P_4$, $P_5$ are configured as cell specific. In this case, there is no difference in the configuration for both $P_4$ and $P_5$ between an anchor carrier and a non-anchor carrier in one NB-IoT cell. In an embodiment, the third configured parameter $P_3$ may be transmitted in Msg4, and the fourth and fifth configured parameters $P_4$, $P_5$ may be transmitted in SIB2-NB. Alternatively, the fourth and fifth configured parameters $P_4$, $P_5$ may be configured as carrier specific. In this case, $P_4$ and $P_5$ can be flexibly and separately configured for an anchor carrier and each non-anchor carrier in one NB-IoT cell. Thus, the fourth and fifth configured parameters $P_4$, $P_5$ may be transmitted in SIB22-NB or Msg4. In some embodiments, the third data-to-pilot power ratio $\rho_3$ is equal to the third configured parameter $P_3$. The fourth configured parameter $P_4$ may be an index that refers to the linear ratio between $\rho_4$ and $\rho_3$, i.e., $$10^{\left(\frac{\rho_4}{10}\right)}/10^{\left(\frac{\rho_3}{10}\right)}.$$

The fifth configured parameter $P_5$ may be an index that refers to the linear ratio between $\rho_5$ and $\rho_3$, i.e., $$10^{\left(\frac{\rho_5}{10}\right)}/10^{\left(\frac{\rho_3}{10}\right)}.$$

Alternatively, in some embodiments, for the In-band employment, the data-to-pilot power ratio information may comprise the third configured parameter $P_3$ and the fourth configured parameter $P_4$, and does not include the fifth configured parameter $P_5$. The third configured parameter $P_3$ may be configured as UE specific, and the fourth configured parameter $P_4$ may be configured as cell specific or carrier specific. Thus, the third configured parameter $P_3$ may be transmitted in Msg4, and the fourth configured parameter $P_4$ may be transmitted in SIB2-NB if $P_4$ is configured as cell specific, or may be transmitted in SIB22-NB or Msg4 if $P_4$ is configured as carrier specific.

Additionally, in some embodiments, the first configured parameter $P_1$ or the third configured parameter $P_3$ may be set to a default value when the 16 QAM modulation scheme is used for Radio Resource Control (RRC) dedicated signaling. For example, during RRC connection establishment, when the 16 QAM modulation scheme is applied to Msg4 for random access, the default value of the first configured parameter $P_1$ or the third configured parameter $P_3$ may be used for 16 QAM demodulation of Msg4.

In order to signal the downlink power allocation for 16 QAM modulation scheme, new information elements (IEs) should be introduced. There are two ways to introduce the IEs in 3GPP TS36.331 for different transmissions of the downlink power allocation. In the following IEs, "p-a-nb" refers to the first configured parameter $P_1$ or the third configured parameter $P_3$, "p-b-nb" refers to the second configured parameter $P_2$ or the fourth configured parameter $P_4$, and "p-c-nb" refers to the fifth configured parameter $P_5$. Moreover, a set of values for p-b-nb and p-c-nb can be expressed in terms of "indices" referring to a Table in some part of the specification containing power ratio (e.g. $\rho_B/\rho_A$ and $\rho_C/\rho_A$, where $\rho_A$ refers to $\rho_1$ or $\rho_3$, $\rho_B$ refers to $\rho_2$ or $\rho_4$ $\rho_C$ refers to $\rho_5$), or can be expressed in terms of "power ratios in linear domain". In the following IEs, p-b-nb and p-c-nb are assumed to be expressed in terms of "indices", and "INTEGER { . . . }" is a place holder for a set of values consisting of integer numbers.

In the case that the first configured parameter $P_1$ or the third configured parameter $P_3$ is transmitted in Msg4, while the second configured parameter $P_2$ or the fourth configured parameter $P_4$, as well as the fifth configured parameter $P_5$ are transmitted in SIB2-NB, the IEs "RadioResourceConfigCommonSIB-NB", "PhysicalConfigDedicated-NB" and "NPDSCH-Config-NB" are used.

The IE RadioResourceConfigCommonSIB-NB is used to specify common radio resource configurations in the system information, e.g., random access parameters and static physical layer parameters. In this IE, the configured parameter is expressed in bold fonts.

RadioResourceConfigCommonSIB-NB information element

```
-- ASN1START
RadioResourceConfigCommonSIB-NB-r13 ::= SEQUENCE {
  rach-ConfigCommon-r13                     RACH-ConfigCommon-NB-r13,
  bcch-Config-r13                           BCCH-Config-NB-r13,
  pcch-Config-r13                           PCCH-Config-NB-r13,
  nprach-Config-r13                         NPRACH-ConfigSIB-NB-r13,
  npdsch-ConfigCommon-r13                   NPDSCH-ConfigCommon-NB-r13,
  npusch-ConfigCommon-r13                   NPUSCH-ConfigCommon-NB-r13,
  dl-Gap-r13                                DL-GapConfig-NB-r13          OPTIONAL,     -- Need OP
  uplinkPowerControlCommon-r13              UplinkPowerControlCommon-NB-r13,
  ...,
  [[          nprach-Config-v1330           NPRACH-ConfigSIB-NB-v1330    OPTIONAL      -- Need OR
  ]],
  [[          nprach-Config-v1450           NPRACH-ConfigSIB-NB-v1450    OPTIONAL      -- Cond
EnhPowerControl
  ]],
  [[          nprach-Config-v1530           NPRACH-ConfigSIB-NB-v1530    OPTIONAL,  -- Need OR
              dl-Gap-v1530                  DL-GapConfig-NB-v1530        OPTIONAL,  -- Cond TDD
              wus-Config-r15                WUS-Config-NB-r15            OPTIONAL   -- Need OR
  ]],
  [[          nprach-Config-v1550           NPRACH-ConfigSIB-NB-v1550    OPTIONAL   -- CondTDD1
  ]],
  [[
              gwus-Config-r16               GWUS-Config-NB-r16           OPTIONAL,  -- Need OR
              nrs-NonAnchorConfig-r16       ENUMERATED {true}            OPTIONAL,  -- Need OR
              ue-SpecificDRX-CycleMin-r16   ENUMERATED {rf32, rf64, rf128, rf256, rf512,
                                                       rf1024}           OPTIONAL   -- Need OR
  ]],
  [[
              npdsch-ConfigCommon-r17       NPDSCH-ConfigCommon-NB-r17,  OPTIONAL   -- Cond dl16Qam
  ]]
}
BCCH-Config-NB-r13 ::=            SEQUENCE {
  modificationPeriodCoeff-r13               ENUMERATED {n16, n32, n64, n128}
}
PCCH-Config-NB-r13 ::=            SEQUENCE {
  defaultPagingCycle-r13                    ENUMERATED {rf128, rf256, rf512, rf1024},
  nB-r13                                    ENUMERATED {
                                                fourT, twoT, oneT, halfT, quarterT, one8thT,
                                                one16thT, one32ndT, one64thT,
                                                one128thT, one256thT, one512thT, one1024thT,
                                                spare3, spare2, spare1},
  npdcch-NumRepetitionPaging-r13            ENUMERATED {
                                                r1, r2, r4, r8, r16, r32, r64, r128,
                                                r256, r512, r1024, r2048,
                                                spare4, spare3, spare2, spare1}
}
-- ASN1STOP
```

The IE PhysicalConfigDedicated-NB is used to specify the UE specific physical channel configuration. In this IE, the configured parameter is expressed in bold fonts.

PhysicalConfigDedicated-NB information element

```
-- ASN1START
PhysicalConfigDedicated-NB-r13 :: = SEQUENCE {
  carrierConfigDedicated-r13          CarrierConfigDedicated-NB-r13              OPTIONAL,     --Need ON
  npdcch-ConfigDedicated-r13          NPDCCH-ConfigDedicated-NB-r13              OPTIONAL,     --Need ON
  npusch-ConfigDedicated-r13          NPUSCH-ConfigDedicated-NB-r13              OPTIONAL,     -- Need ON
  uplinkPowerControlDedicated-r13     UplinkPowerControlDedicated-NB-r13         OPTIONAL,     -- Need ON
  ...,
  [[      twoHARQ-ProcessesConfig-r14  ENUMERATED {true}        OPTIONAL         -- Need OR
  ]],
  [[      interferenceRandomisationConfig-r14 ENUMERATED {true}        OPTIONAL  -- Need OR
  ]],
  [[      npdcch-ConfigDedicated-v1530  NPDCCH-ConfigDedicated-NB-v1530          OPTIONAL      -- Cond TDD
  ]],
  [[      additionalTxSIB1-Config-v1540          ENUMERATED {true}     OPTIONAL  -- Cond additionalSIB1
  ]],
  [[      npusch-ConfigDedicated-v1610           NPUSCH-ConfigDedicated-NB-v1610
                                                             OPTIONAL,        -- Cond twoHARQ
          npdsch-ConfigDedicated-r16             NPDSCH-ConfigDedicated-NB-r16
                                                             OPTIONAL,
          resourceReservationConfigDL-r16        SetupRelease {ResourceReservationConfig-NB-r16}
                                                             OPTIONAL,        -- Cond dl-NonAnchor
          resourceReservationConfigUL-r16        SetupRelease {ResourceReservationConfig-NB-r16}
                                                             OPTIONAL         -- Cond ul-NonAnchor
  ]],
  [[
          npdsch-ConfigDedicated-r17             NPDSCH-ConfigDedicated-NB-r17 OPTIONAL -- Cond dl16Qam
  ]]
}
-- ASN1STOP
```

The IE NPDSCH-Config-NB provides NPDSCH-ConfigCommon-NB which is used to specify the common NPDSCH configuration and NPDSCH-ConfigDedicated-NB which is used to specify the UE specific NPDSCH configuration. In this IE, NPDSCH-ConfigCommon-NB and NPDSCH-ConfigDedicated-NB are expressed in bold fonts.

NPDSCH-Config-NB information element

```
-- ASN1START
NPDSCH-ConfigCommon-NB-r13 ::=     SEQUENCE {
  nrs-Power-r13                      INTEGER (-60..50)
}
NPDSCH-ConfigDedicated-NB-r16 ::=    SEQUENCE {
  npdsch-MultiTB-Config-r16            NPDSCH-MultiTB-Config-NB-r16   OPTIONAL   -- Cond twoHARQ
}
NPDSCH-MultiTB-Config-NB-r16 ::=     SEQUENCE {
  multiTB-Config-r16                   ENUMERATED {interleaved, nonInterleaved},
  harq-AckBundling-r16                 ENUMERATED {true}      OPTIONAL    -- Cond interleaved
}
NPDSCH-ConfigCommon-NB-r17 ::= SEQUENCE {
  p-b-nb                             INTEGER (...)
  p-c-nb                             INTEGER (...)   OPTIONAL -- Cond Inband
}
NPDSCH-ConfigDedicated-NB-r17 ::=    SEQUENCE {
  p-a-nb   ENUMERATED {dB-6, dB-4dot77, dB-3, dB-1dot77, dB0, dB1, dB2, dB3}
}
-- ASN1STOP
```

In the case that the first configured parameter $P_1$ or the third configured parameter $P_3$ is transmitted in Msg4, while the second configured parameter $P_2$ or the fourth configured parameter $P_4$, as well as the fifth configured parameter $P_5$ are transmitted in SIB22-NB or Msg4, the IEs "NPDSCH-Config-NB", "PhysicalConfigDedicated-NB" and "DL-CarrierConfigCommon-NB are used.

The IE NPDSCH-Config-NB provides NPDSCH-Config-Common-NB which is used to specify the common NPDSCH configuration and NPDSCH-ConfigDedicated-NB which is used to specify the UE specific NPDSCH configuration. In this IE, NPDSCH-ConfigCommon-NB and NPDSCH-ConfigDedicated-NB are expressed in bold fonts.

NPDSCH-Config-NB information element

```
-- ASN1START
NPDSCH-ConfigCommon-NB-r13 ::=     SEQUENCE {
  nrs-Power-r13                      INTEGER (−60..50)
}
NPDSCH-ConfigDedicated-NB-r16 ::=    SEQUENCE {
  npdsch-MultiTB-Config-r16            NPDSCH-MultiTB-Config-NB-r16   OPTIONAL   -- Cond twoHARQ
}
NPDSCH-MultiTB-Config-NB-r16 ::=     SEQUENCE {
  multiTB-Config-r16                   ENUMERATED {interleaved, nonInterleaved},
  harq-AckBundling-r16                 ENUMERATED {true}   OPTIONAL   -- Cond interleaved
}
NPDSCH-ConfigDedicated-NB-r17 ::=    SEQUENCE {
   p-a-nb  ENUMERATED {dB-6, dB-4dot77, dB-3, dB-1dot77, dB0, dB1, dB2, dB3}
   p-b-nb  INTEGER (...)                                         OPTIONAL, -- Need OR
  p-c-nb INTEGER (...)                   OPTIONAL, -- Need OR
}
-- ASN1STOP
```

The IE PhysicalConfigDedicated-NB is used to specify the UE specific physical channel configuration. In this IE, the configured parameter is expressed in bold fonts.

PhysicalConfigDedicated-NB information element

```
-- ASN1START
PhysicalConfigDedicated-NB-r13 ::=            SEQUENCE {
  carrierConfigDedicated-r13                      CarrierConfigDedicated-NB-r13              OPTIONAL,  -- Need ON
  npdcch-ConfigDedicated-r13                      NPDCCH-ConfigDedicated-NB-r13              OPTIONAL,  -- Need ON
  npusch-ConfigDedicated-r13                      NPUSCH-ConfigDedicated-NB-r13              OPTIONAL,  -- Need ON
  uplinkPowerControlDedicated-r13                 UplinkPowerControlDedicated-NB-r13         OPTIONAL,  -- Need ON
  ...,
  [[              twoHARQ-ProcessesConfig-r14     ENUMERATED {true}      OPTIONAL        -- Need OR
  ]],
  [[              interferenceRandomisationConfig-r14        ENUMERATED {true}   OPTIONAL   -- Need OR
  ]],
  [[              npdcch-ConfigDedicated-v1530    NPDCCH-ConfigDedicated-NB-v1530            OPTIONAL   -- Cond TDD
  ]],
  [[              additionalTxSIB1-Config-v1540    ENUMERATED {true}          OPTIONAL   -- Cond additionalSIB1
  ]],
  [[              npusch-ConfigDedicated-v1610               NPUSCH-ConfigDedicated-NB-v1610
                                                                                  OPTIONAL,  -- Cond twoHARQ
                  npdsch-ConfigDedicated-r16                 NPDSCH-ConfigDedicated-NB-r16
                                                                                  OPTIONAL,
                  resourceReservationConfigDL-r16  SetupRelease {ResourceReservationConfig-NB-r16}
                                                                                  OPTIONAL,  -- Cond dl-NonAnchor
                  resourceReservationConfigUL-r16            SetupRelease {ResourceReservationConfig-NB-r16}
                                                                                  OPTIONAL   -- Cond ul-NonAnchor
]],
[[
                  npdsch-ConfigDedicated-r17                 NPDSCH-ConfigDedicated-NB-r17 OPTIONAL -- Cond dl16Qam
]]
}
```

The IE DL-CarrierConfigCommon-NB is used to specify the common configuration of a DL non-anchor carrier in NB-IoT. In this IE, the configured parameter is expressed in bold fonts.

DL-CarrierConfigCommon-NB information elements

```
-- ASN1START
DL-CarrierConfigCommon-NB-r14 ::=        SEQUENCE {
  dl-CarrierFreq-r14                       CarrierFreq-NB-r13,
  downlinkBitmapNonAnchor-r14              CHOICE {
    useNoBitmap-r14                          NULL,
    useAnchorBitmap-r14                      NULL,
    explicitBitmapConfiguration-r14          DL-Bitmap-NB-r13
  },
  dl-GapNonAnchor-r14                      CHOICE {
    useNoGap-r14                             NULL,
    useAnchorGapConfig-r14                   NULL,
    explicitGapConfiguration-r14             DL-GapConfig-NB-r13
  },
  inbandCarrierInfo-r14                    SEQUENCE {
    samePCI-Indicator-r14                    CHOICE {
      samePCI-r14                              SEQUENCE {
        indexToMidPRB-r14                        INTEGER (-55..54)
      },
      differentPCI-r14                         SEQUENCE {
        eutra-NumCRS-Ports-r14                   ENUMERATED {same, four}
      }
    }  OPTIONAL,          -- Cond anchor-guardband-or-standalone
    eutraControlRegionSize-r14               ENUMERATED {n1, n2, n3}
  }  OPTIONAL,                  -- Cond non-anchor-inband
  nrs-PowerOffsetNonAnchor-r14             ENUMERATED {dB-12, dB-10, dB-8, dB-6,
                                               dB-4, dB-2, dB0, dB3}      DEFAULT dB0,
  ...,
  [[              dl-GapNonAnchor-v1530  DL-GapConfig-NB-v1530   OPTIONAL    -- Cond TDD
  ]],
  [[              dl-CarrierFreq-v1550   CarrierFreq-NB-v1550    OPTIONAL    -- Cond TDD
  ]],
  [[              p-b-nb   INTEGER (...)   OPTIONAL   -- Cond dl16Qam
                  p-c-nb   INTEGER (...)   OPTIONAL   -- Cond dl160amAndInband
  ]]
}
-- ASN1STOP
```

For the UE specific parameter p-a-nb, a default physical channel configuration is configured, where

| Name | Value | Semantics description | Ver |
|---|---|---|---|
| NPDSCH-ConfigDedicated-NB >p-a-nb | dB0 | | |

Additionally, in some embodiments, the network node may further determine the NPDSCH EPRE at least partly based on the data-to-pilot power ratio information.

In the case of the Stand-alone deployment or the Guard-band deployment, the network node may determine the NPDSCH EPRE as follows:

i) In the case that the data-to-pilot power ratio information includes the first data-to-pilot power ratio $\rho_1$ and the second data-to-pilot power ratio $\rho_2$, for NPDSCH symbols without NRS,
NPDSCH EPRE=NRS EPRE+$\rho_1$, and for NPDSCH symbols with NRS,
NPDSCH EPRE=NRS EPRE+$\rho_2$;

ii) In the case that the data-to-pilot power ratio information includes the first configured parameter $P_1$ and the second configured parameter $P_2$, for NPDSCH symbols without NRS,
NPDSCH EPRE=NRS EPRE+$\rho_1$, where $\rho_1=P_1$, for NPDSCH symbols with NRS,
NPDSCH EPRE=NRS EPRE+$\rho_2$, where $\rho_2$ is calculated based on $P_2$ and $\rho_1$, and $P_2$ is an index that refers to the linear ratio between $\rho_2$ and $\rho_1$, i.e., $$10^{\left(\frac{\rho_1}{10}\right)}/10^{\left(\frac{\rho_2}{10}\right)}.$$

In the case of the In-band deployment, the network node may determine the NPDSCH EPRE as follows:

i) In the case that the data-to-pilot power ratio information includes the third data-to-pilot power ratio $\rho_3$, the fourth data-to-pilot power ratio $\rho_4$, and the fifth data-to-pilot power ratio $\rho_5$, for NPDSCH symbols without NRS and without CRS,
NPDSCH EPRE=NRS EPRE+$\rho_3$, for NPDSCH symbols with NRS and without CRS,
NPDSCH EPRE=NRS EPRE+$\rho_4$, and for NPDSCH symbols without NRS and with CRS,
NPDSCH EPRE=NRS EPRE+$\rho_5$ ii) In the case that the data-to-pilot power ratio information includes the third configured parameter $P_3$, the fourth configured parameter $P_4$, and the fifth configured parameter $P_5$, for NPDSCH symbols without NRS and without CRS,
NPDSCH EPRE=NRS EPRE+$\rho_3$, where $\rho_3=P_3$, for NPDSCH symbols with NRS and without CRS,
NPDSCH EPRE=NRS EPRE+$\rho_4$, where $\rho_4$ is calculated based on $P_4$ and $\rho_3$, and $P_4$ is an index that refers to the linear ratio between $\rho_4$ and $\rho_3$, i.e., $$10^{\left(\frac{\rho_4}{10}\right)}/10^{\left(\frac{\rho_3}{10}\right)},$$

and for NPDSCH symbols without NRS and with CRS,

NPDSCH EPRE=NRS EPRE+$\rho_5$, where $\rho_5$ is calculated based on $P_5$ and $\rho_3$, and $P_5$ may be an index that refers to the linear ratio between $\rho_5$ and $\rho_3$, i.e., $$10^{\left(\frac{\rho_5}{10}\right)}/10^{\left(\frac{\rho_3}{10}\right)};$$

iii) In the case that that the data-to-pilot power ratio information includes the third configured parameter $P_3$ and the fourth configured parameter $P_4$, and does not include the fifth configured parameter $P_5$, for NPDSCH symbols without NRS and without CRS, NPDSCH EPRE=NRS EPRE+$\rho_3$, where $\rho_3$=$P_3$, for NPDSCH symbols with NRS and without CRS, NPDSCH EPRE=NRS EPRE+$\rho_4$, where $\rho_4$ is calculated based on $P_4$ and $\rho_3$, and $P_4$ is an index that refers to the linear ratio between $\rho_4$ and $\rho_3$, i.e., $$10^{\left(\frac{\rho_4}{10}\right)}/10^{\left(\frac{\rho_3}{10}\right)},$$

and for NPDSCH symbols without NRS and with CRS,

NPDSCH EPRE is calculated as a function of a ratio of NRS EPRE to CRS EPRE, nrs-CRS-PowerOffset, under a pre-defined assumption.

The pre-defined assumption may be that, for example, the ratio of NPDSCH EPRE between Type A and Type C is 0 dB, or the total symbol powers for Type A and Type C are the same.

In some embodiments, the NRS EPRE is carrier specific. The NRS EPRE for the anchor carrier is different from the NRS EPRE for the non-anchor carrier. In an embodiments, for the anchor carrier, NRS EPRE=nrs-Power, and for the non-anchor carrier, NRS EPRE=nrs-Power+nrs-powerOffsetNonAnchor, where the parameter nrs-Power is provided by higher layers which is the same for all carriers in the same NB-IoT cell and nrs-PowerOffsetNonAnchor is carrier specific.

Additionally, in some embodiments, the network node may transmit the NPDSCH EPRE determined as above described to the terminal device.

Figure 2:
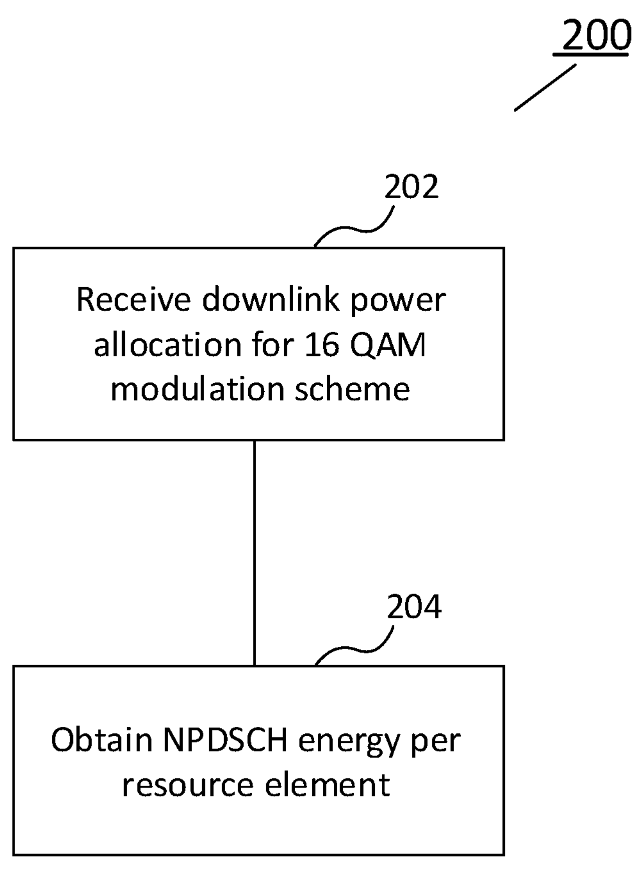
FIG. 2 is a flowchart illustrating a method implemented at a terminal device in the NB-IoT system according to some embodiments of the present disclosure.

FIG. 2 is a flowchart illustrating a method 200 according to some embodiments of the present disclosure. The method 200 illustrated in FIG. 2 may be performed by an apparatus implemented in/as a terminal device in the NB-IoT system or communicatively coupled to a terminal device in the NB-IoT system. In accordance with an exemplary embodiment, the terminal device may be a UE or a NB-IoT device. In the following description with respect to FIG. 2, for the same or similar parts as those in the previous exemplary embodiments, the detailed description will be properly omitted.

According to the exemplary method 200 illustrated in FIG. 2, the UE receives the downlink power allocation for 16 QAM modulation scheme from a network node in the NB-IoT system, as shown in block 202. The downlink power allocation indicates the data-to-pilot power ratio information to be used for determining NPDSCH EPRE. In some embodiments, the network node may be an eNodeB.

Then in block 204, the UE obtains the NPDSCH EPRE determined at least partly based on the data-to-pilot power ratio information. In some embodiments, the UE may obtain the NPDSCH EPRE by receiving the NPDSCH EPRE from the network node. Alternatively, in some embodiments, the UE may determine the NPDSCH EPRE by itself. As described above, the data-to-pilot power ratio information may be different depending on the deployment mode of the NB-IoT system. Accordingly, the determination of the NPDSCH EPRE may be different depending on the deployment mode. In some embodiments, the NPDSCH EPRE may depend on NRS EPRE in addition to the data-to-pilot power ratio information.

In some embodiments, the NRS EPRE is carrier specific. The carrier specific NRS EPRE can be derived from the downlink narrowband reference-signal transmit power given by nrs-Power+nrs-PowerOffsetNonAnchor, where the parameter nrs-Power is provided by higher layers which is the same for all carriers in the same NB-IoT cell and nrs-PowerOffsetNonAnchor is carrier specific. In some embodiments, the difference in terms of NRS EPRE between an anchor carrier and a non-anchor carrier can be expressed as follows:

for an anchor carrier,

NRS EPRE=nrs-Power, and for a non-anchor carrier,

NRS EPRE=nrs-Power+nrs-powerOffsetNonAnchor.

In some embodiments, for the Stand-alone deployment or the Guard-band deployment, the data-to-pilot power ratio information may comprise the first data-to-pilot power ratio $\rho_1$ and the second data-to-pilot power ratio $\rho_2$. The first data-to-pilot power ratio $\rho_1$ and the second data-to-pilot power ratio $\rho_2$ may be configured as UE specific and thus may be received in Msg4. In this case, the UE may determine the NPDSCH EPRE as follows:

for NPDSCH symbols without NRS,

NPDSCH EPRE=NRS EPRE+$\rho_1$; and for NPDSCH symbols with NRS,

NPDSCH EPRE=NRS EPRE+$\rho_2$.

Alternatively, in some embodiments, for the Stand-alone deployment or the Guard-band deployment, the data-to-pilot power ratio information may comprise the first configured parameter $P_1$ and the second configured parameter $P_2$. The first configured parameter $P_1$ may be configured as UE specific and received in Msg4 for random access, and the second configured parameter $P_2$ may be configured as cell specific or carrier specific. Thus, the first configured parameter $P_1$ may be received in Msg4, and the second configured parameter $P_2$ may be received in SIB2-NB when it is cell specific or in SIB22-NB or Msg4 when it is carrier specific. In this case, the UE may determine the NPDSCH EPRE as follows:

for NPDSCH symbols without NRS,

NPDSCH EPRE=NRS EPRE+$\rho_1$, where $\rho_1$=$P_1$ for NPDSCH symbols with NRS, NPDSCH EPRE=NRS EPRE+$\rho_2$, where $\rho_2$ is calculated based on $P_2$ and $\rho_1$, and $P_2$ is an index that refers to the linear ratio between $\rho_2$ and $\rho_1$, i.e., $$10^{\left(\frac{\rho_1}{10}\right)}/10^{\left(\frac{\rho_2}{10}\right)}.$$

In some embodiments, for the In-band deployment, the data-to-pilot power ratio information may comprise the third data-to-pilot power ratio $\rho_3$, the fourth data-to-pilot power ratio $\rho_4$, and the fifth data-to-pilot power ratio $\rho_5$. The third, fourth and fifth data-to-pilot power ratios $\rho_3$, $\rho_4$ and $\rho_5$ may be configured as UE specific, and thus may be received in Msg4. In this case, the UE may determine the NPDSCH EPRE as follows:

for NPDSCH symbols without NRS and without CRS,
NPDSCH EPRE=NRS EPRE+$\rho_3$;
for NPDSCH symbols with NRS and without CRS,
NPDSCH EPRE=NRS EPRE+$\rho_4$; and
for NPDSCH symbols without NRS and with CRS,
NPDSCH EPRE=NRS EPRE+$\rho_5$.

Alternatively, in some embodiments, for the In-band deployment, the data-to-pilot power ratio information may comprise the third configured parameter $P_3$, the fourth configured parameter $P_4$, and the fifth configured parameter $P_5$. The third configured parameter $P_3$ may be configured as UE specific, and the fourth and fifth configured parameters $P_4$, $P_5$ may be configured as cell specific or carrier specific. Thus, the third configured parameter $P_3$ may be received in Msg4, and the fourth and fifth configured parameters $P_4$, $P_5$ may be received in SIB2-NB when they are cell specific or in SIB22-NB or Msg4 when they are carrier specific. In this case, the UE may determine the NPDSCH EPRE as follows:

for NPDSCH symbols without NRS and without CRS,
NPDSCH EPRE=NRS EPRE+$\rho_3$, where $\rho_3$=$P_3$
for NPDSCH symbols with NRS and without CRS,
NPDSCH EPRE=NRS EPRE+$\rho_4$, where $\rho_4$ is calculated based on $P_4$ and $\rho_3$, and $P_4$ is an index that refers to the linear ratio between $\rho_4$ and $\rho_3$, i.e., $$10^{\left(\frac{\rho_4}{10}\right)}/10^{\left(\frac{\rho_3}{10}\right)};$$

and for NPDSCH symbols without NRS and with CRS,
NPDSCH EPRE=NRS EPRE+$\rho_5$, where $\rho_5$ is calculated based on $P_5$ and $\rho_3$, and $P_5$ may be an index that refers to the linear ratio between $\rho_5$ and $\rho_3$, i.e., $$10^{\left(\frac{\rho_5}{10}\right)}/10^{\left(\frac{\rho_3}{10}\right)}.$$

Alternatively, in some embodiments, for the In-band deployment, the data-to-pilot power ratio information may comprise the third configured parameter $P_3$ and the fourth configured parameter $P_4$ only. The third configured parameter $P_3$ may be configured as UE specific, and the fourth configured parameter $P_4$ may be configured as cell specific or carrier specific. In this case, the UE may determine the NPDSCH EPRE as follows:

for NPDSCH symbols without NRS and without CRS,
NPDSCH EPRE=NRS EPRE+$\rho_3$, where $\rho_3$=$P_3$
for NPDSCH symbols with NRS and without CRS,
NPDSCH EPRE=NRS EPRE+$\rho_4$, where $\rho_4$ is calculated based on $P_4$ and $\rho_3$, and $P_4$ is an index that refers to the linear ratio between $\rho_4$ and $\rho_3$, i.e., $$10^{\left(\frac{\rho_4}{10}\right)}/10^{\left(\frac{\rho_3}{10}\right)};$$

and for NPDSCH symbols without NRS and with CRS,
NPDSCH EPRE is calculated as a function of a ratio of NRS EPRE to CRS EPRE, nrs-CRS-PowerOffset, under a pre-defined assumption.

The pre-defined assumption may be that, for example, the ratio of NPDSCH EPRE between Type A and Type C is 0 dB, or the total symbol powers for Type A and Type C are the same.

It can be therefore seen that, with the proposed solutions of downlink power allocation for 16 QAM modulation scheme in NB-IoT according to the above embodiments, the 16 QAM modulation scheme can be supported in downlink in the NB-IoT system, and can also be supported for both anchor and non-anchor carriers.

The various blocks shown in FIGS. 1-2 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 3:
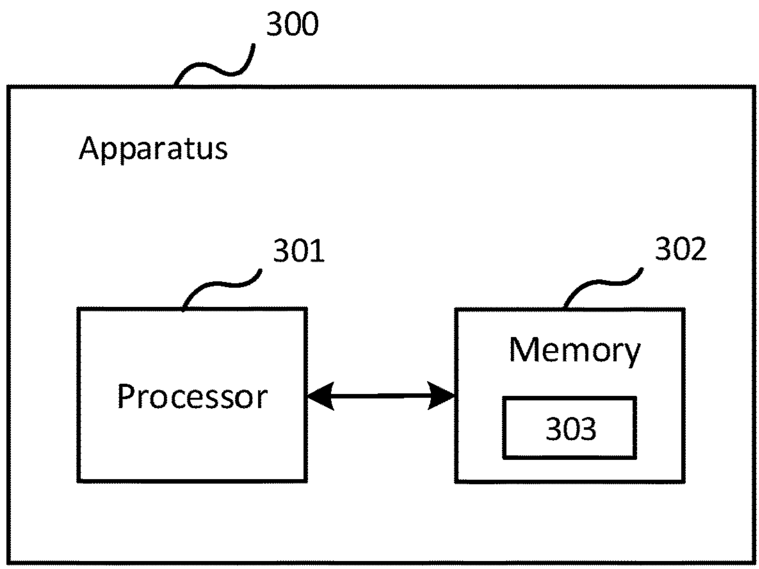
FIG. 3 is a block diagram illustrating an apparatus according to some embodiments of the present disclosure.

FIG. 3 is a block diagram illustrating an apparatus 300 according to various embodiments of the present disclosure. As shown in FIG. 3, the apparatus 300 may comprise one or more processors such as processor 301 and one or more memories such as memory 302 storing computer program codes 303. The memory 302 may be non-transitory machine/processor/computer readable storage medium. In accordance with some exemplary embodiments, the apparatus 300 may be implemented as an integrated circuit chip or module that can be plugged or installed into a network node as described with respect to FIG. 1, or a terminal device as described with respect to FIG. 2.

In some implementations, the one or more memories 302 and the computer program codes 303 may be configured to, with the one or more processors 301, cause the apparatus 300 at least to perform any operation of the method as described in connection with FIG. 1. In such embodiments, the apparatus 300 may be implemented as at least part of or communicatively coupled to the network node as described above. As a particular example, the apparatus 300 may be implemented as a network node.

In other implementations, the one or more memories 302 and the computer program codes 303 may be configured to, with the one or more processors 301, cause the apparatus 300 at least to perform any operation of the method as described in connection with FIG. 2. In such embodiments, the apparatus 300 may be implemented as at least part of or communicatively coupled to the terminal device as described above. As a particular example, the apparatus 300 may be implemented as a terminal device.

Alternatively or additionally, the one or more memories 302 and the computer program codes 303 may be configured to, with the one or more processors 301, cause the apparatus 300 at least to perform more or less operations to implement the proposed methods according to the exemplary embodiments of the present disclosure.

Figure 4:
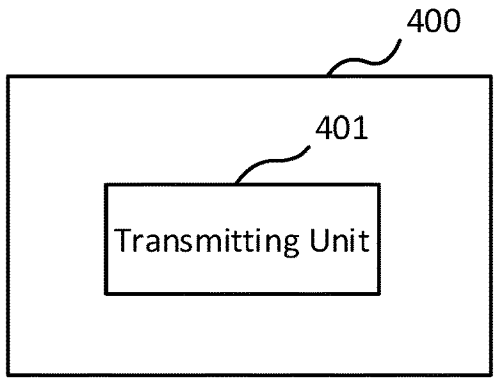
FIG. 4 is a block diagram illustrating an apparatus according to some embodiments of the present disclosure.

FIG. 4 is a block diagram illustrating an apparatus 400 according to some embodiments of the present disclosure. As shown in FIG. 4, the apparatus 400 may comprise a transmitting unit 401. In an exemplary embodiment, the apparatus 400 may be implemented in a network node such as eNodeB. The transmitting unit 401 may be operable to carry out the operation in block 102. Optionally, the transmitting unit 401 may be operable to carry out more or less operations to implement the proposed methods according to the exemplary embodiments of the present disclosure.

Figure 5:
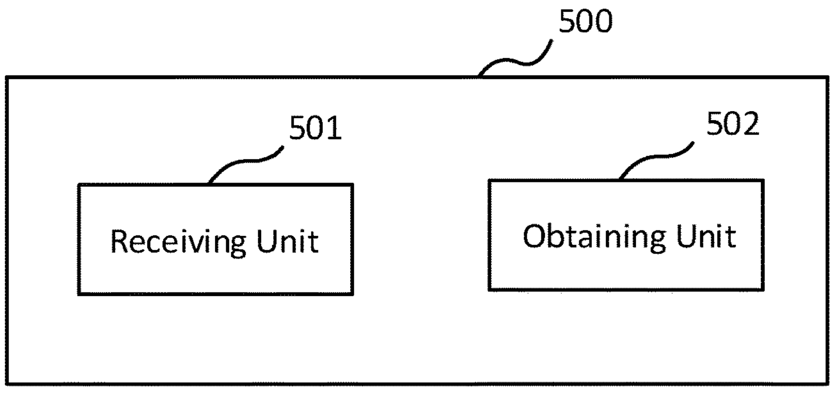
FIG. 5 is a block diagram illustrating an apparatus according to some embodiments of the present disclosure.

FIG. 5 is a block diagram illustrating an apparatus 500 according to some embodiments of the present disclosure. As shown in FIG. 5, the apparatus 500 may comprise a receiving unit 501 and a obtaining unit 502. In an exemplary embodiment, the apparatus 500 may be implemented in a terminal device such as a UE. The receiving unit 501 may be operable to carry out the operation in block 202. The obtaining unit 502 may be operable to carry out the operation in block 204. Optionally, the receiving unit 501 and/or the obtaining unit 502 may be operable to carry out more or less operations to implement the proposed methods according to the exemplary embodiments of the present disclosure.

Figure 6:
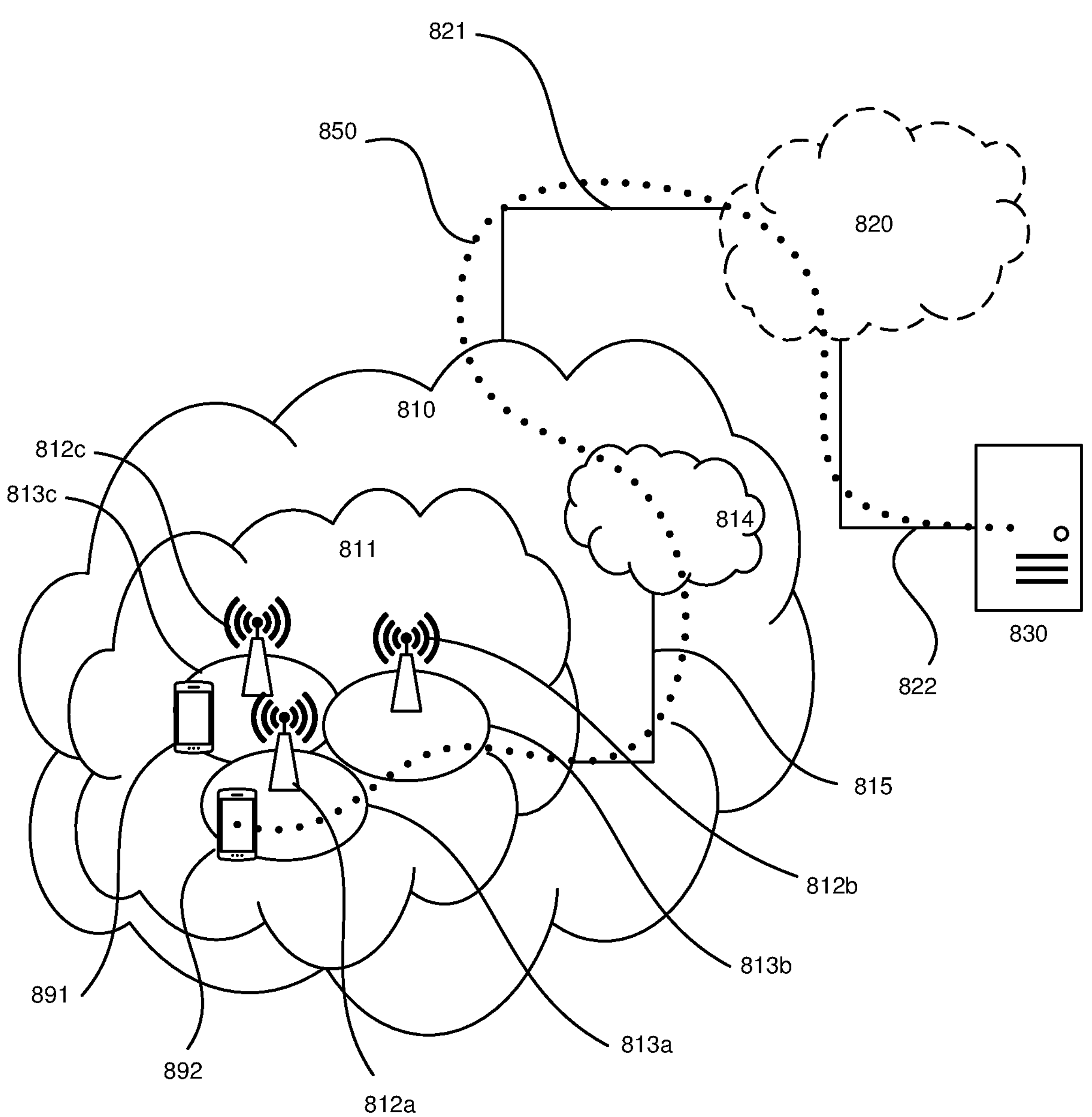
FIG. 6 is a block diagram illustrating a telecommunication network connected via an intermediate network to a host computer in accordance with some embodiments of the present disclosure.

FIG. 6 is a block diagram illustrating a telecommunication network connected via an intermediate network to a host computer in accordance with some embodiments of the present disclosure.

With reference to FIG. 6, in accordance with an embodiment, a communication system includes a telecommunication network 810, such as a 3GPP-type cellular network, which comprises an access network 811, such as a radio access network, and a core network 814. The access network 811 comprises a plurality of base stations 812*a*, 812*b*, 812*c*, such as NBs, eNBs, gNBs or other types of wireless access points, each defining a corresponding coverage area 813*a*, 813*b*, 813*c*. Each base station 812*a*, 812*b*, 812*c* is connectable to the core network 814 over a wired or wireless connection 815. A first UE 891 located in a coverage area 813*c* is configured to wirelessly connect to, or be paged by, the corresponding base station 812*c*. A second UE 892 in a coverage area 813*a* is wirelessly connectable to the corresponding base station 812*a*. While a plurality of UEs 891, 892 are illustrated in this example, the disclosed embodiments are equally applicable to a situation where a sole UE is in the coverage area or where a sole UE is connecting to the corresponding base station 812.

The telecommunication network 810 is itself connected to a host computer 830, which may be embodied in the hardware and/or software of a standalone server, a cloud-implemented server, a distributed server or as processing resources in a server farm. The host computer 830 may be under the ownership or control of a service provider, or may be operated by the service provider or on behalf of the service provider. Connections 821 and 822 between the telecommunication network 810 and the host computer 830 may extend directly from the core network 814 to the host computer 830 or may go via an optional intermediate network 820. An intermediate network 820 may be one of, or a combination of more than one of, a public, private or hosted network; the intermediate network 820, if any, may be a backbone network or the Internet; in particular, the intermediate network 820 may comprise two or more sub-networks (not shown).

The communication system of FIG. 6 as a whole enables connectivity between the connected UEs 891, 892 and the host computer 830. The connectivity may be described as an over-the-top (OTT) connection 850. The host computer 830 and the connected UEs 891, 892 are configured to communicate data and/or signaling via the OTT connection 850, using the access network 811, the core network 814, any intermediate network 820 and possible further infrastructure (not shown) as intermediaries. The OTT connection 850 may be transparent in the sense that the participating communication devices through which the OTT connection 850 passes are unaware of routing of uplink and downlink communications. For example, the base station 812 may not or need not be informed about the past routing of an incoming downlink communication with data originating from the host computer 830 to be forwarded (e.g., handed over) to a connected UE 891. Similarly, the base station 812 need not be aware of the future routing of an outgoing uplink communication originating from the UE 891 towards the host computer 830.

Figure 7:
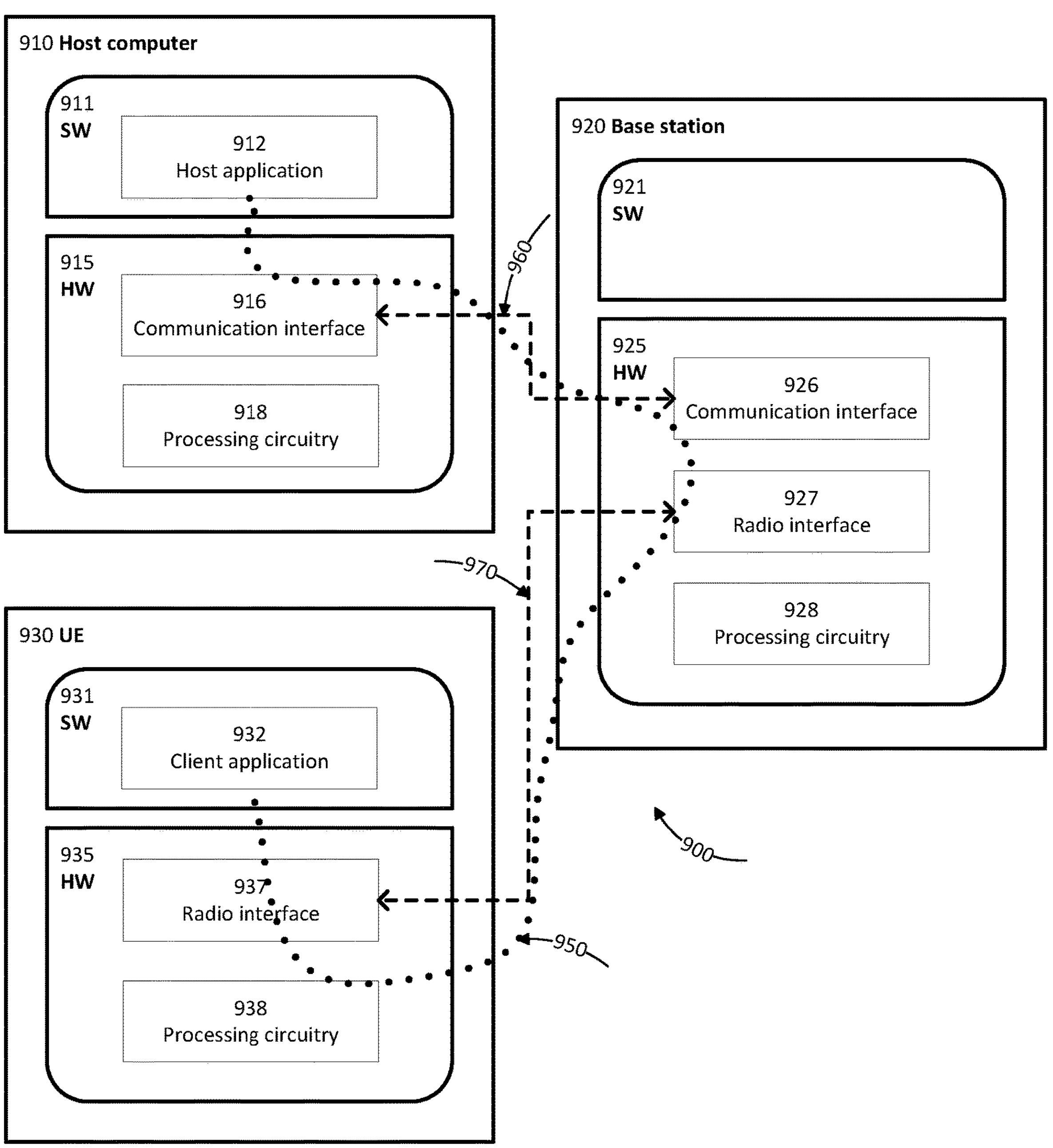
FIG. 7 is a block diagram illustrating a host computer communicating via a base station with a UE over a partially wireless connection in accordance with some embodiments of the present disclosure.

FIG. 7 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 7. In a communication system 900, a host computer 910 comprises hardware 915 including a communication interface 916 configured to set up and maintain a wired or wireless connection with an interface of a different communication device of the communication system 900. The host computer 910 further comprises a processing circuitry 918, which may have storage and/or processing capabilities. In particular, the processing circuitry 918 may comprise one or more programmable processors, application-specific integrated circuits, field programmable gate arrays or combinations of these (not shown) adapted to execute instructions. The host computer 910 further comprises software 911, which is stored in or accessible by the host computer 910 and executable by the processing circuitry 918. The software 911 includes a host application 912. The host application 912 may be operable to provide a service to a remote user, such as UE 930 connecting via an OTT connection 950 terminating at the UE 930 and the host computer 910. In providing the service to the remote user, the host application 912 may provide user data which is transmitted using the OTT connection 950.

The communication system 900 further includes a base station 920 provided in a telecommunication system and comprising hardware 925 enabling it to communicate with the host computer 910 and with the UE 930. The hardware 925 may include a communication interface 926 for setting up and maintaining a wired or wireless connection with an interface of a different communication device of the communication system 900, as well as a radio interface 927 for setting up and maintaining at least a wireless connection 970 with the UE 930 located in a coverage area (not shown in FIG. 7) served by the base station 920. The communication interface 926 may be configured to facilitate a connection 960 to the host computer 910. The connection 960 may be direct or it may pass through a core network (not shown in FIG. 7) of the telecommunication system and/or through one or more intermediate networks outside the telecommunication system. In the embodiment shown, the hardware 925 of the base station 920 further includes a processing circuitry 928, which may comprise one or more programmable processors, application-specific integrated circuits, field programmable gate arrays or combinations of these (not shown) adapted to execute instructions. The base station 920 further has software 921 stored internally or accessible via an external connection.

The communication system 900 further includes the UE 930 already referred to. Its hardware 935 may include a radio interface 937 configured to set up and maintain a wireless connection 970 with a base station serving a coverage area in which the UE 930 is currently located. The hardware 935 of the UE 930 further includes a processing circuitry 938, which may comprise one or more programmable processors, application-specific integrated circuits, field programmable gate arrays or combinations of these (not shown) adapted to execute instructions. The UE 930 further comprises software 931, which is stored in or accessible by the UE 930 and executable by the processing circuitry 938. The software 931 includes a client application 932. The client application 932 may be operable to provide a service to a human or non-human user via the UE 930, with the support of the host computer 910. In the host computer 910, an executing host application 912 may communicate with the executing client application 932 via the OTT connection 950 terminating at the UE 930 and the host computer 910. In providing the service to the user, the client application 932 may receive request data from the host application 912 and provide user data in response to the request data. The OTT connection 950 may transfer both the request data and the user data. The client application 932 may interact with the user to generate the user data that it provides.

It is noted that the host computer 910, the base station 920 and the UE 930 illustrated in FIG. 7 may be similar or identical to the host computer 830, one of base stations 812*a*, 812*b*, 812*c* and one of UEs 891, 892 of FIG. 6, respectively. This is to say, the inner workings of these entities may be as shown in FIG. 7 and independently, the surrounding network topology may be that of FIG. 6.

In FIG. 7, the OTT connection 950 has been drawn abstractly to illustrate the communication between the host computer 910 and the UE 930 via the base station 920, without explicit reference to any intermediary devices and the precise routing of messages via these devices. Network infrastructure may determine the routing, which it may be configured to hide from the UE 930 or from the service provider operating the host computer 910, or both. While the OTT connection 950 is active, the network infrastructure may further take decisions by which it dynamically changes the routing (e.g., on the basis of load balancing consideration or reconfiguration of the network).

Wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 950 between the host computer 910 and the UE 930, in response to variations in the measurement results. The measurement procedure and/or the network functionality for reconfiguring the OTT connection 950 may be implemented in software 911 and hardware 915 of the host computer 910 or in software 931 and hardware 935 of the UE 930, or both. In embodiments, sensors (not shown) may be deployed in or in association with communication devices through which the OTT connection 950 passes; the sensors may participate in the measurement procedure by supplying values of the monitored quantities exemplified above, or supplying values of other physical quantities from which the software 911, 931 may compute or estimate the monitored quantities. The reconfiguring of the OTT connection 950 may include message format, retransmission settings, preferred routing etc.; the reconfiguring need not affect the base station 920, and it may be unknown or imperceptible to the base station 920. Such procedures and functionalities may be known and practiced in the art. In certain embodiments, measurements may involve proprietary UE signaling facilitating the host computer 910's measurements of throughput, propagation times, latency and the like. The measurements may be implemented in that the software 911 and 931 causes messages to be transmitted, in particular empty or 'dummy' messages, using the OTT connection 950 while it monitors propagation times, errors etc.

Figure 8:
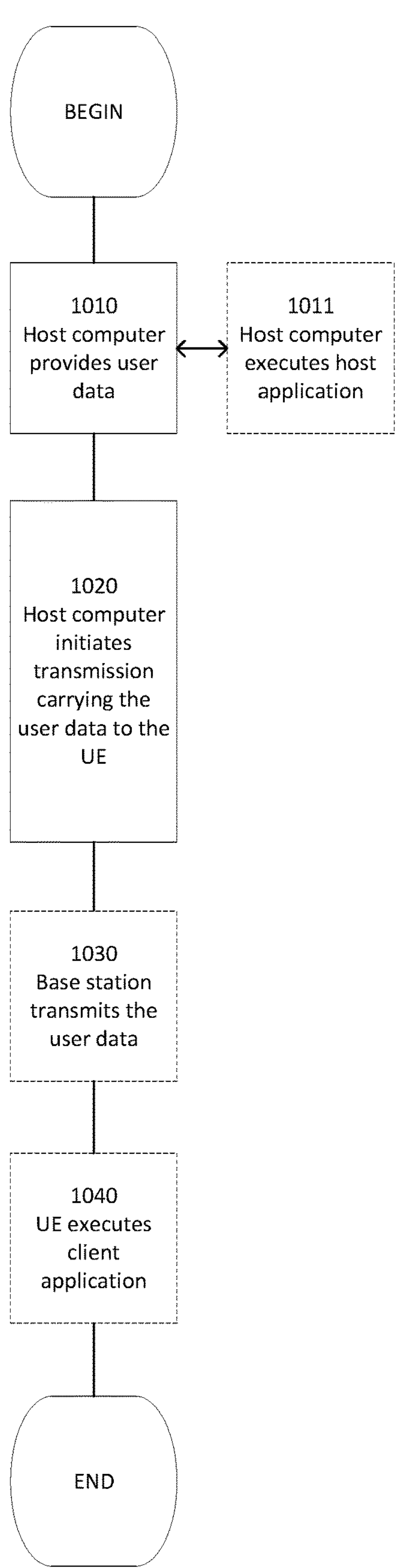
FIG. 8 is a flowchart illustrating a method implemented in a communication system, in accordance with an embodiment of the present disclosure.

FIG. 8 is a flowchart illustrating a method implemented in a communication system, in accordance with an embodiment. The communication system includes a host computer, a base station and a UE which may be those described with reference to FIG. 6 and FIG. 7. For simplicity of the present disclosure, only drawing references to FIG. 8 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 9:
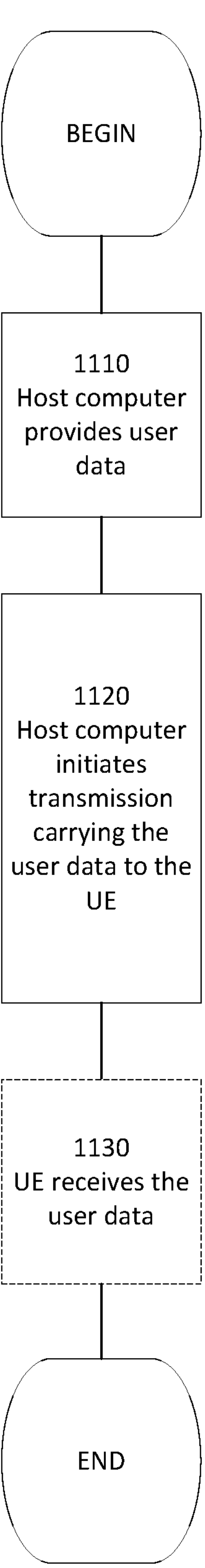
FIG. 9 is a flowchart illustrating a method implemented in a communication system, in accordance with an embodiment of the present disclosure.

FIG. 9 is a flowchart illustrating a method implemented in a communication system, in accordance with an embodiment. The communication system includes a host computer, a base station and a UE which may be those described with reference to FIG. 6 and FIG. 7. For simplicity of the present disclosure, only drawing references to FIG. 9 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 10:
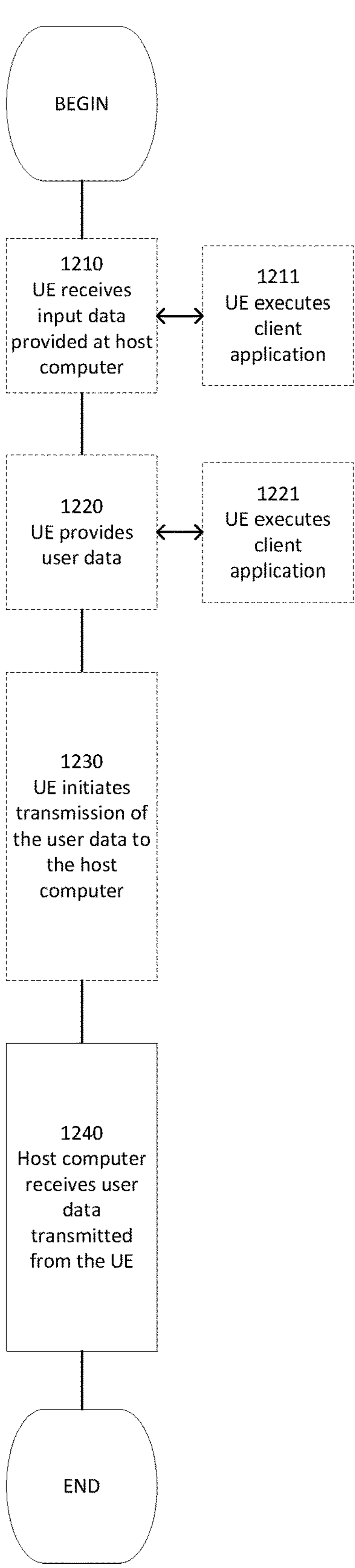
FIG. 10 is a flowchart illustrating a method implemented in a communication system, in accordance with an embodiment of the present disclosure.

FIG. 10 is a flowchart illustrating a method implemented in a communication system, in accordance with an embodiment. The communication system includes a host computer, a base station and a UE which may be those described with reference to FIG. 6 and FIG. 7. For simplicity of the present disclosure, only drawing references to FIG. 10 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 11:
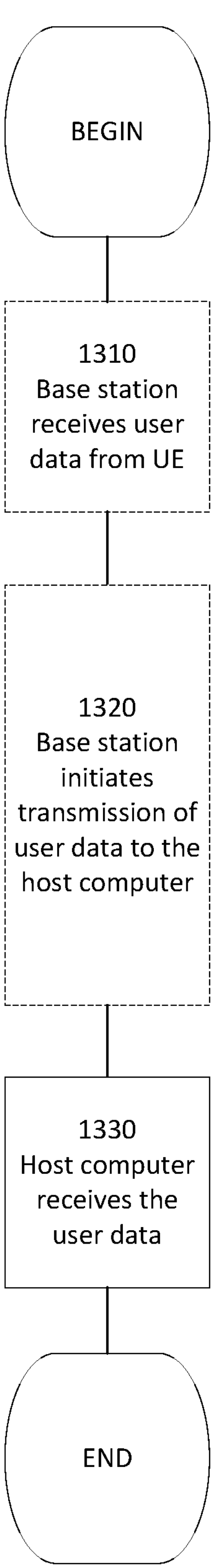
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 6 and FIG. 7. For simplicity of the present disclosure, only drawing references to FIG. 11 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method implemented at a network node in a Narrowband Internet of Thing, NB-IoT, system, comprising:

transmitting downlink power allocation for 16-Quadrature Amplitude Modulation, 16-QAM, modulation scheme to a terminal device in the NB-IoT system, the downlink power allocation indicating data-to-pilot power ratio information to be used for determining Narrowband Physical Downlink Shared Channel, NPDSCH, energy per resource element, EPRE, the data-to-pilot power ratio information comprising a first and a second configured parameter, the first configured parameter comprising a first data-to-pilot power ratio and the second configured parameter comprising a second data-to-pilot power ratio, the NPDSCH EPRE being determined under an assumption that a ratio of NPDSCH EPRE between NPDSCH symbols without a narrowband reference signal, NRS, and without a channel reference signal, CRS, and NPDSCH symbols without a NRS and with a CRS is zero dB.

2. The method according to claim 1, wherein the deployment mode is Stand-alone deployment or Guard-band deployment, and wherein the first data-to-pilot power ratio is for NPDSCH symbols without narrowband reference signal, NRS, and the second data-to-pilot power ratio is for NPDSCH symbols with NRS.

3. The method according to claim 2, wherein the first and second data-to-pilot power ratios are UE specific and transmitted in Msg4 for random access.

4. The method according to claim 1, wherein the deployment mode is In-band deployment, and wherein the data-to-pilot power ratio information comprises a third data-to-pilot power ratio for NPDSCH symbols without NRS and without channel reference signal, CRS, and a fourth data-to-pilot power ratio for NPDSCH symbols with NRS and without CRS, and a fifth data-to-pilot power ratio for NPDSCH symbols without NRS and with CRS.

5. The method according to claim 4, wherein the third, fourth and fifth data-to-pilot power ratios are UE specific and transmitted in Msg4 for random access.

6. The method according to claim 1, wherein the deployment mode is Stand-alone deployment or Guard-band deployment, and wherein the first data-to-pilot power ratio is for NPDSCH symbols without NRS, and the second data-to-pilot power ratio is for NPDSCH symbols with NRS and the first data-to-pilot power ratio.

7. The method according to claim 6, wherein the first configured parameter is UE specific and transmitted in Msg4 for random access; and the second configured parameter is cell specific and transmitted in System Information Block 2-NB or the second configured parameter is carrier specific and transmitted in System Information Block 22-NB or in Msg4 for random access.

8. The method according to claim 1, wherein the deployment mode is In-band deployment, and wherein the data-to-pilot power ratio information comprises a third configured parameter indicating a third data-to-pilot power ratio for NPDSCH symbols without NRS and without CRS, a fourth configured parameter indicating a linear ratio between a fourth data-to-pilot power ratio for NPDSCH symbols with NRS and without CRS and the third data-to-pilot power ratio, and a fifth configured parameter indicating a linear ratio between a fifth data-to-pilot power ratio for NPDSCH symbols without NRS and with CRS and the third data-to-pilot power ratio.

9. The method according to claim 8, wherein the third configured parameter is UE specific and transmitted in Msg4 for random access; and the fourth and fifth configured parameters are cell specific and transmitted in System Information Block 2-NB or the fourth and fifth configured parameters are carrier specific and received in System Information Block 22-NB or in Msg4 for random access.

10. The method according to claim 1, wherein the deployment mode is In-band deployment, and wherein the data-to-pilot power ratio information comprises a third configured parameter indicating a third data-to-pilot power ratio for NPDSCH symbols without NRS and without CRS, and a fourth configured parameter indicating a linear ratio between a fourth data-to-pilot power ratio for NPDSCH symbols with NRS and without CRS and the third data-to-pilot power ratio.

11. The method according to claim 10, wherein the third configured parameter is UE specific and transmitted in Msg4 for random access; and the fourth configured parameter is cell specific and transmitted in System Information Block 2-NB or the fourth configured parameter is carrier specific and transmitted in System Information Block 22-NB or in Msg4 for random access.

12. A network node in a Narrowband Internet of Thing, NB-IoT, system comprising:

one or more processors; and one or more memories comprising computer program codes, the one or more memories and the computer program codes configured to, with the one or more processors, cause the network node to:

transmit downlink power allocation for 16-Quadrature Amplitude Modulation, 16-QAM, modulation scheme to a terminal device in the NB-IoT system, the downlink power allocation indicating data-to-pilot power ratio information to be used for determining Narrowband Physical Downlink Shared Channel, NPDSCH, energy per resource element, EPRE, the data-to-pilot power ratio information comprising a first and a second configured parameter, the first configured parameter comprising a first data-to-pilot power ratio and the second configured parameter comprising a second data-to-pilot power ratio, the NPDSCH EPRE being determined under an assumption that a ratio of NPDSCH EPRE between NPDSCH symbols without a narrowband reference signal, NRS, and without a channel reference signal, CRS, and NPDSCH symbols without a NRS and with a CRS is zero dB.

13. The network node according to claim 12, wherein the deployment mode is Stand-alone deployment or Guard-band deployment, and wherein the first data-to-pilot power ratio is for NPDSCH symbols without narrowband reference signal, NRS, and the second data-to-pilot power ratio is for NPDSCH symbols with NRS.

14. A terminal device in a Narrowband Internet of Thing, NB-IoT, system comprising:

one or more processors; and one or more memories comprising computer program codes, the one or more memories and the computer program codes configured to, with the one or more processors, cause the terminal device to:

receive downlink power allocation for 16-Quadrature Amplitude Modulation, 16-QAM, modulation scheme from a network node in the NB-IoT system, the downlink power allocation indicating data-to-pilot power ratio information to be used for determining Narrowband Physical Downlink Shared Channel, NPDSCH, energy per resource element, EPRE, the data-to-pilot power ratio information comprising a first and a second configured parameter, the first configured parameter comprising a first data-to-pilot power ratio and the second configured parameter comprising a second data-to-pilot power ratio, the NPDSCH EPRE being determined under an assumption that a ratio of NPDSCH EPRE between NPDSCH symbols without a narrowband reference signal, NRS, and without a channel reference signal, CRS, and NPDSCH symbols without a NRS and with a CRS is zero dB; and obtain the NPDSCH EPRE determined at least partly based on the data-to-pilot power ratio information.

15. The terminal device according to claim 14, wherein the deployment mode is Stand-alone deployment or Guard-band deployment, and wherein the first data-to-pilot power ratio is for NPDSCH symbols without narrowband reference signal, NRS, and the second data-to-pilot power ratio is for NPDSCH symbols with NRS.

16. A method implemented at a terminal device in a Narrowband Internet of Thing, NB-IoT, system, the method comprising:

receiving downlink power allocation for 16-Quadrature Amplitude Modulation, 16-QAM, modulation scheme from a network node in the NB-IoT system, the downlink power allocation indicating data-to-pilot power ratio information to be used for determining Narrowband Physical Downlink Shared Channel, NPDSCH, energy per resource element, EPRE, the data-to-pilot power ratio information comprising a first and a second configured parameter, the first configured parameter comprising a first data-to-pilot power ratio and the second configured parameter comprising a second data-to-pilot power ratio, the NPDSCH EPRE being determined under an assumption that a ratio of NPDSCH EPRE between NPDSCH symbols without a narrowband reference signal, NRS, and without a channel reference signal, CRS, and NPDSCH symbols without a NRS and with a CRS is zero dB; and obtaining the NPDSCH EPRE determined at least partly based on the data-to-pilot power ratio information.

* * * * *